Oct. 23, 1956     S. E. SCHROEDER     2,767,625
APPARATUS FOR UNIVERSAL ASSEMBLING OF PARTITION STRIPS
Filed Aug. 6, 1951     13 Sheets-Sheet 1
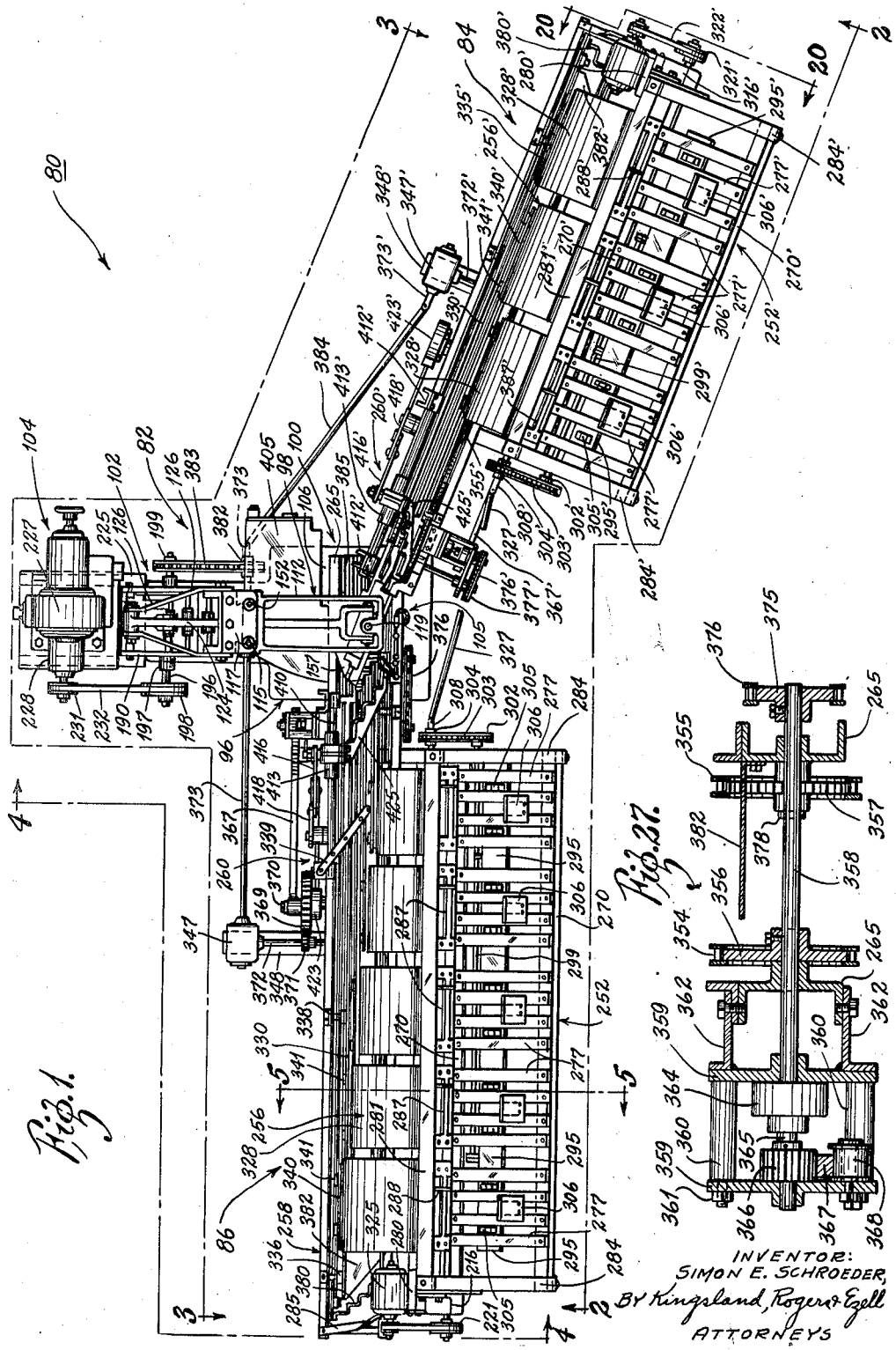
INVENTOR:
SIMON E. SCHROEDER,
By Kingsland, Rogers & Ezell
ATTORNEYS Oct. 23, 1956 S. E. SCHROEDER 2,767,625
APPARATUS FOR UNIVERSAL ASSEMBLING OF PARTITION STRIPS
Filed Aug. 6, 1951 13 Sheets-Sheet 2
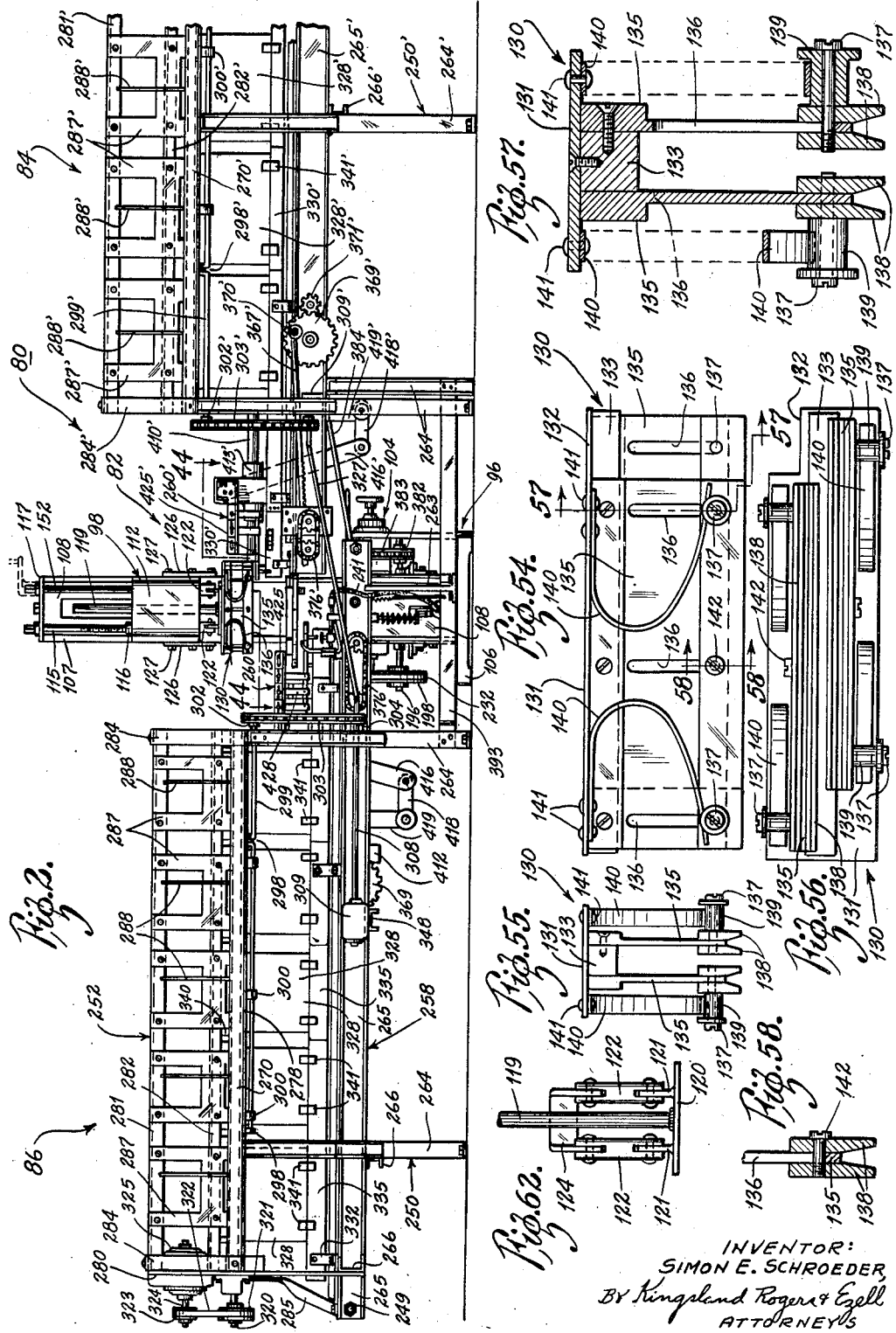
INVENTOR:
SIMON E. SCHROEDER
BY Kingsland Rogers & Ezell
ATTORNEYS

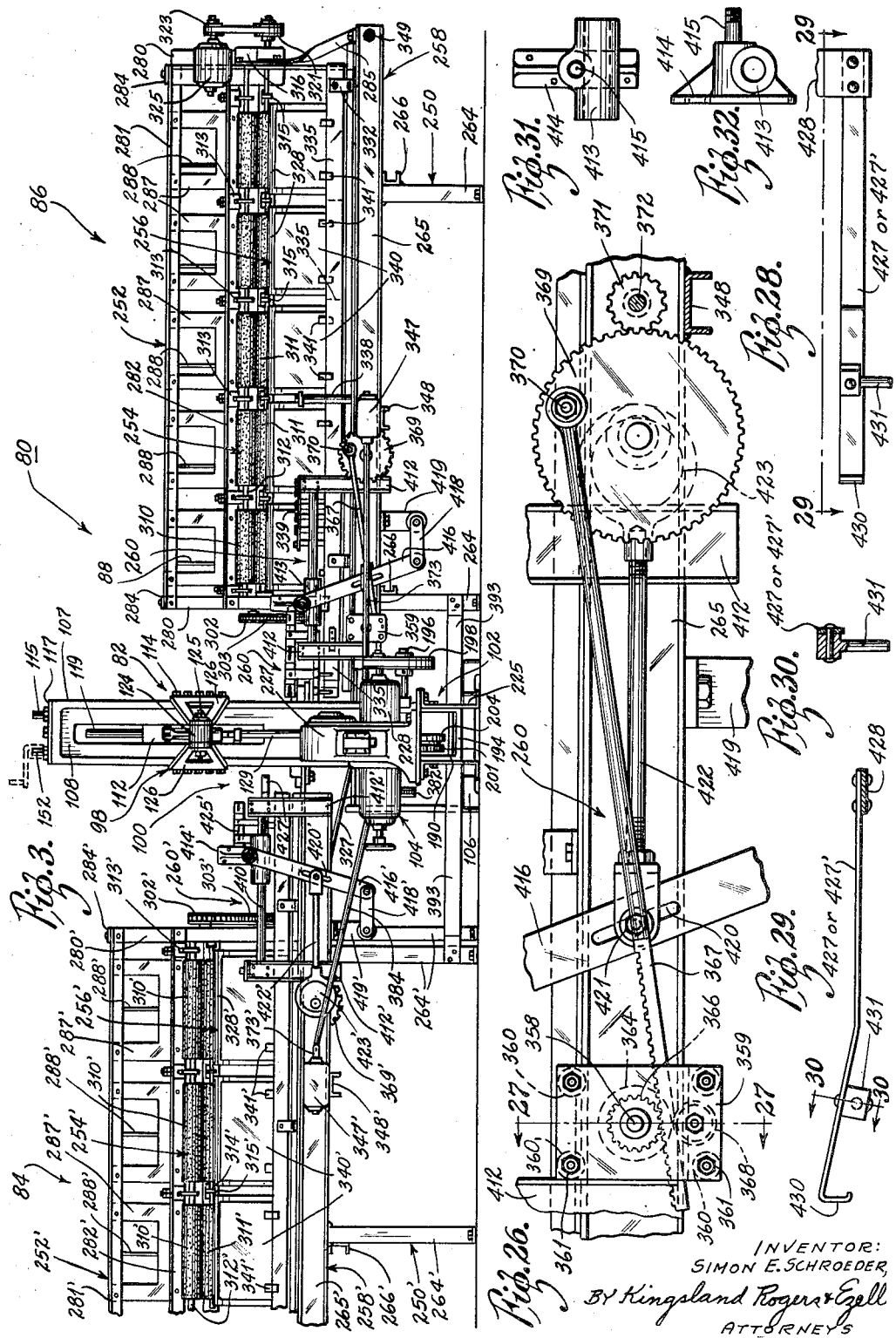

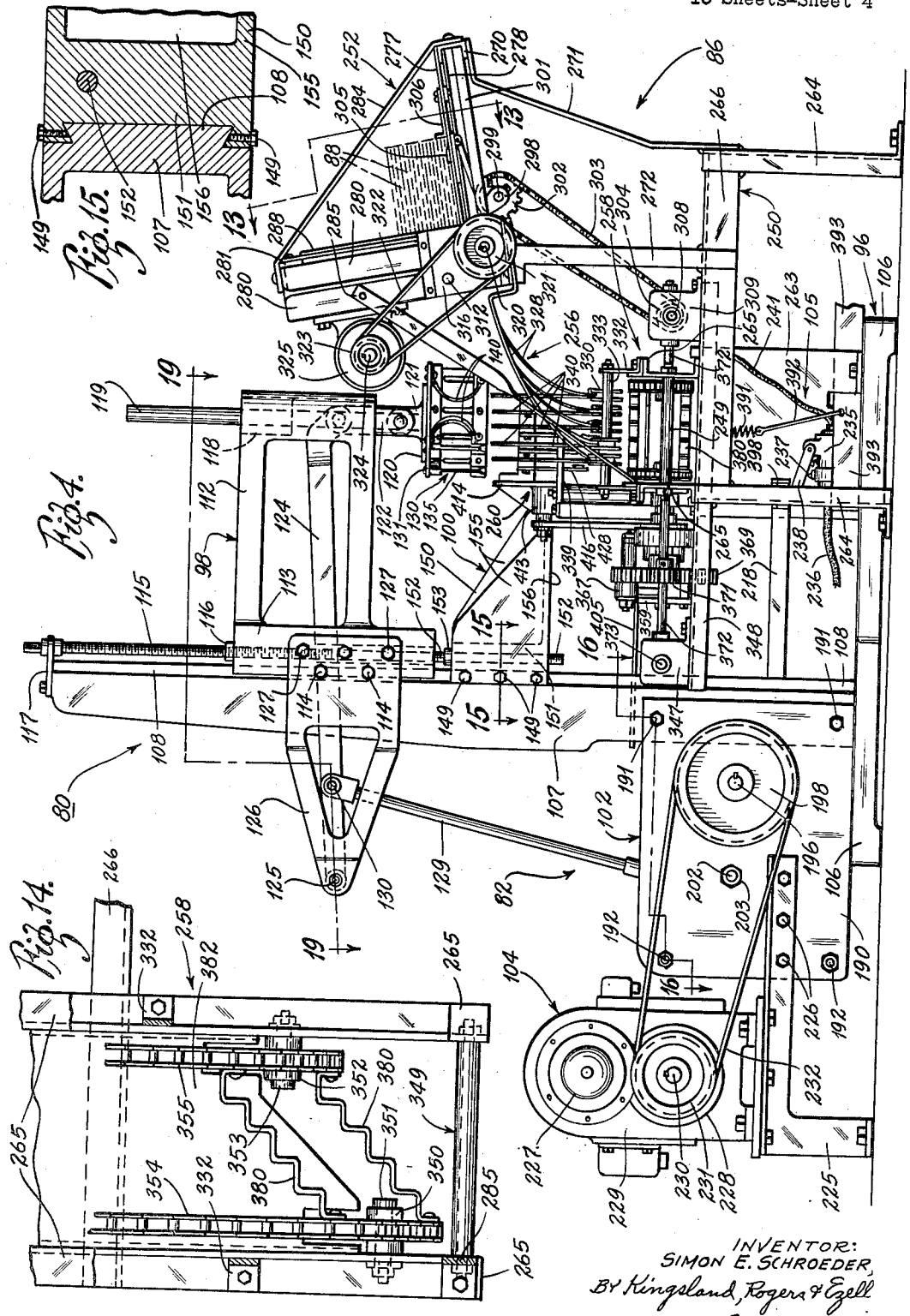

Oct. 23, 1956　　　S. E. SCHROEDER　　　2,767,625
APPARATUS FOR UNIVERSAL ASSEMBLING OF PARTITION STRIPS
Filed Aug. 6, 1951　　　13 Sheets-Sheet 5
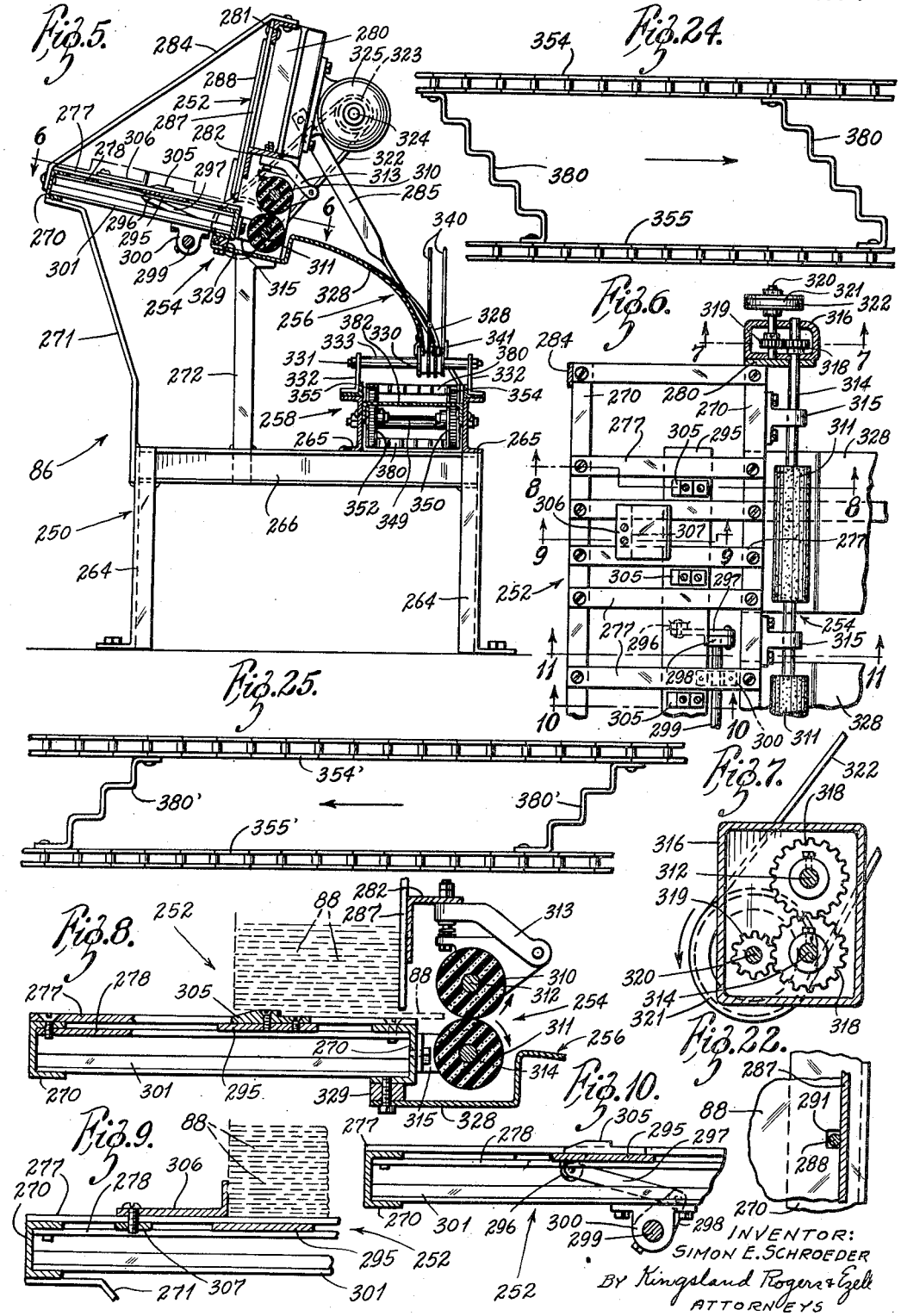
INVENTOR:
SIMON E. SCHROEDER
By Kingsland Rogers & Ezell
ATTORNEYS

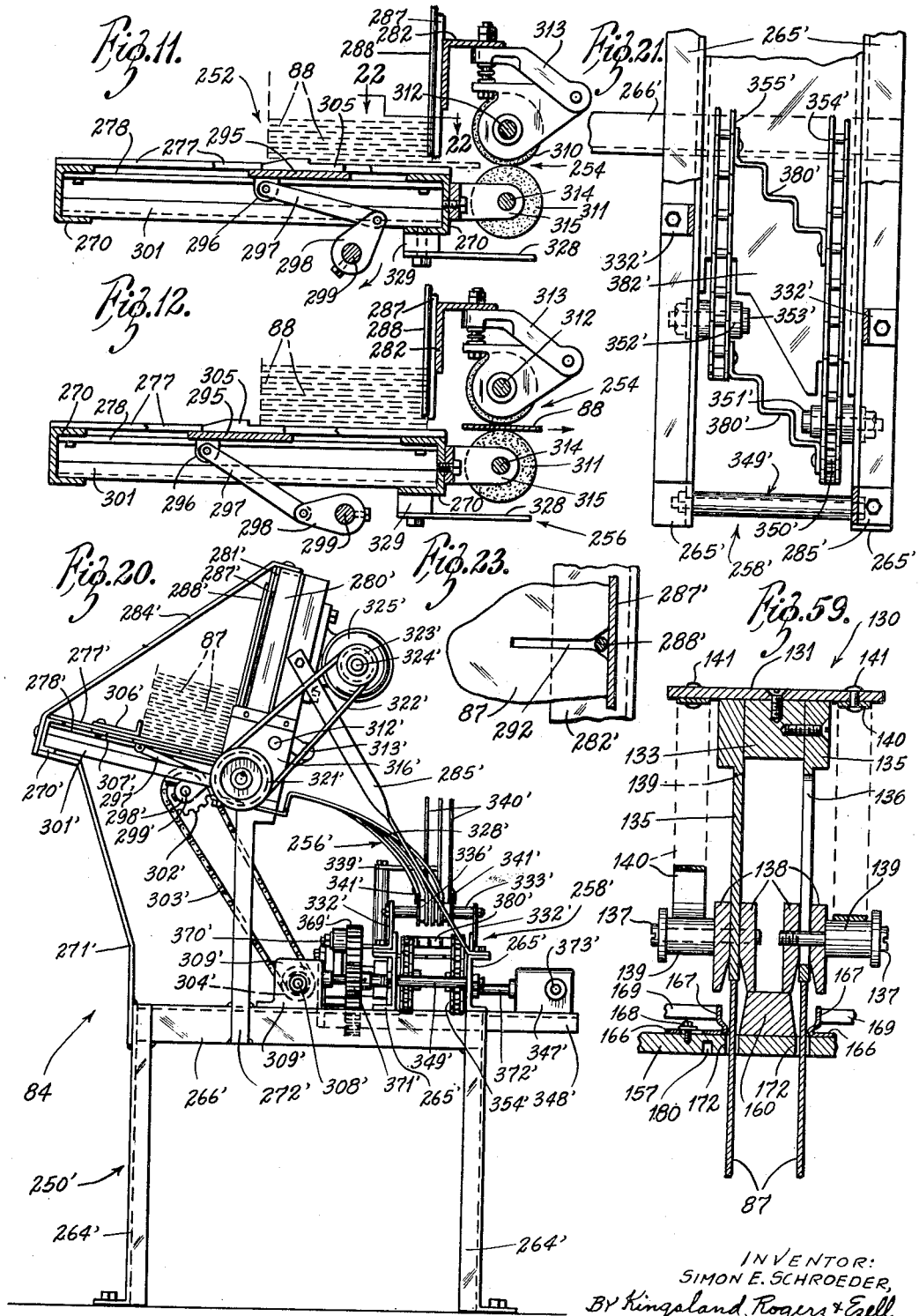

Oct. 23, 1956   S. E. SCHROEDER   2,767,625
APPARATUS FOR UNIVERSAL ASSEMBLING OF PARTITION STRIPS
Filed Aug. 6, 1951   13 Sheets-Sheet 7
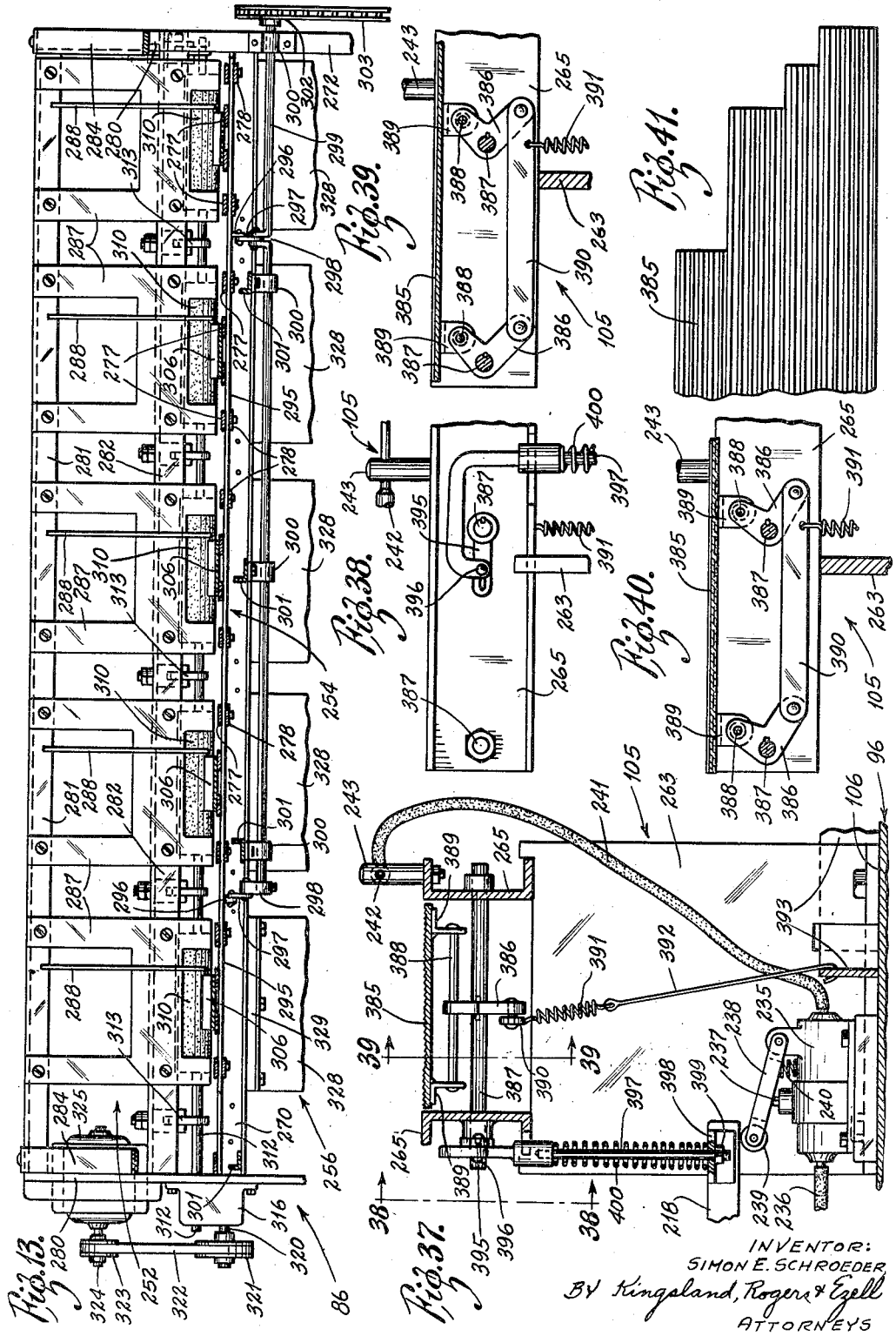
INVENTOR:
SIMON E. SCHROEDER
BY Kingsland, Rogers & Ezell
ATTORNEYS Oct. 23, 1956 S. E. SCHROEDER 2,767,625
APPARATUS FOR UNIVERSAL ASSEMBLING OF PARTITION STRIPS
Filed Aug. 6, 1951 13 Sheets-Sheet 8
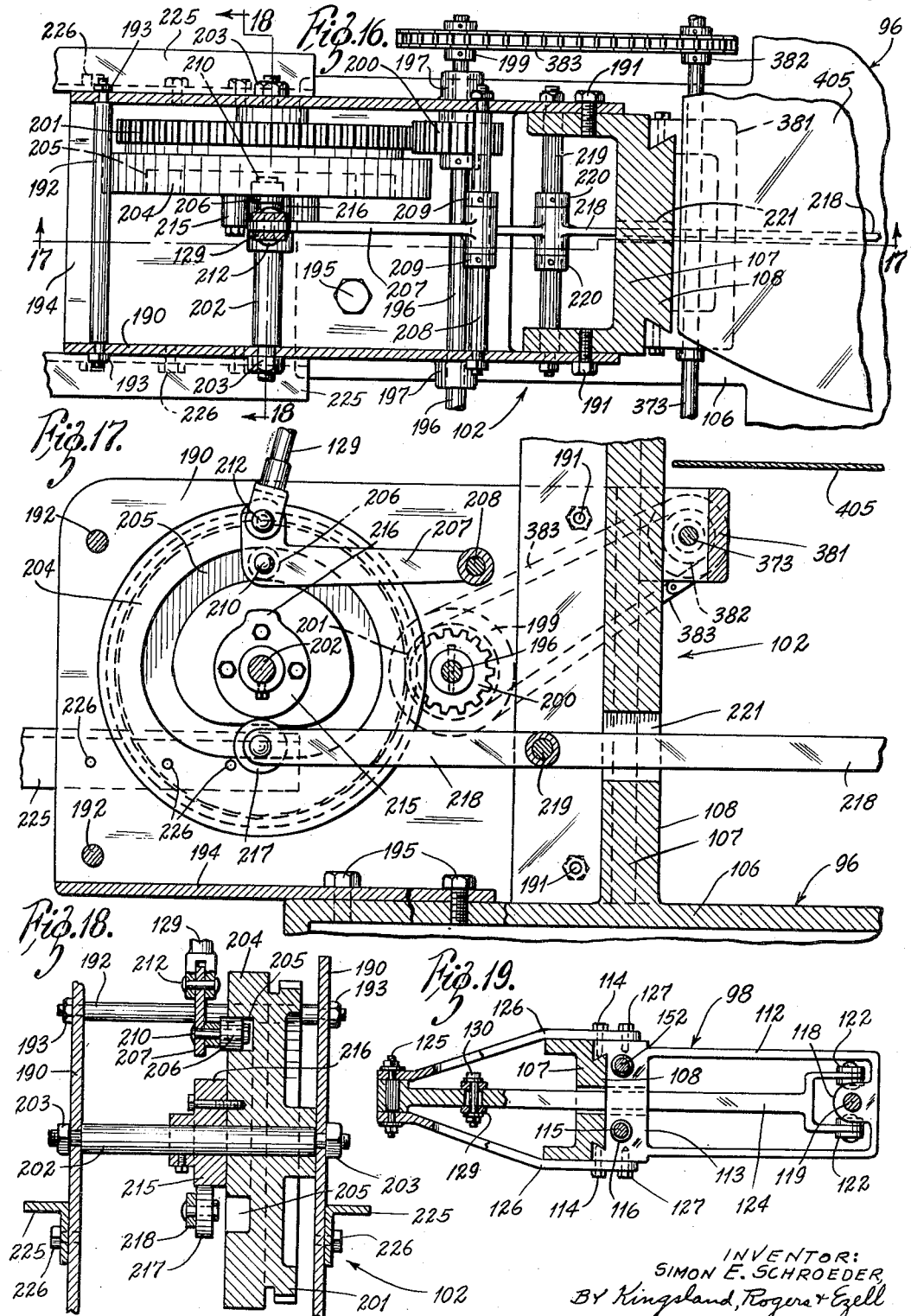
INVENTOR:
SIMON E. SCHROEDER,
BY Kingsland, Rogers & Ezell
ATTORNEYS

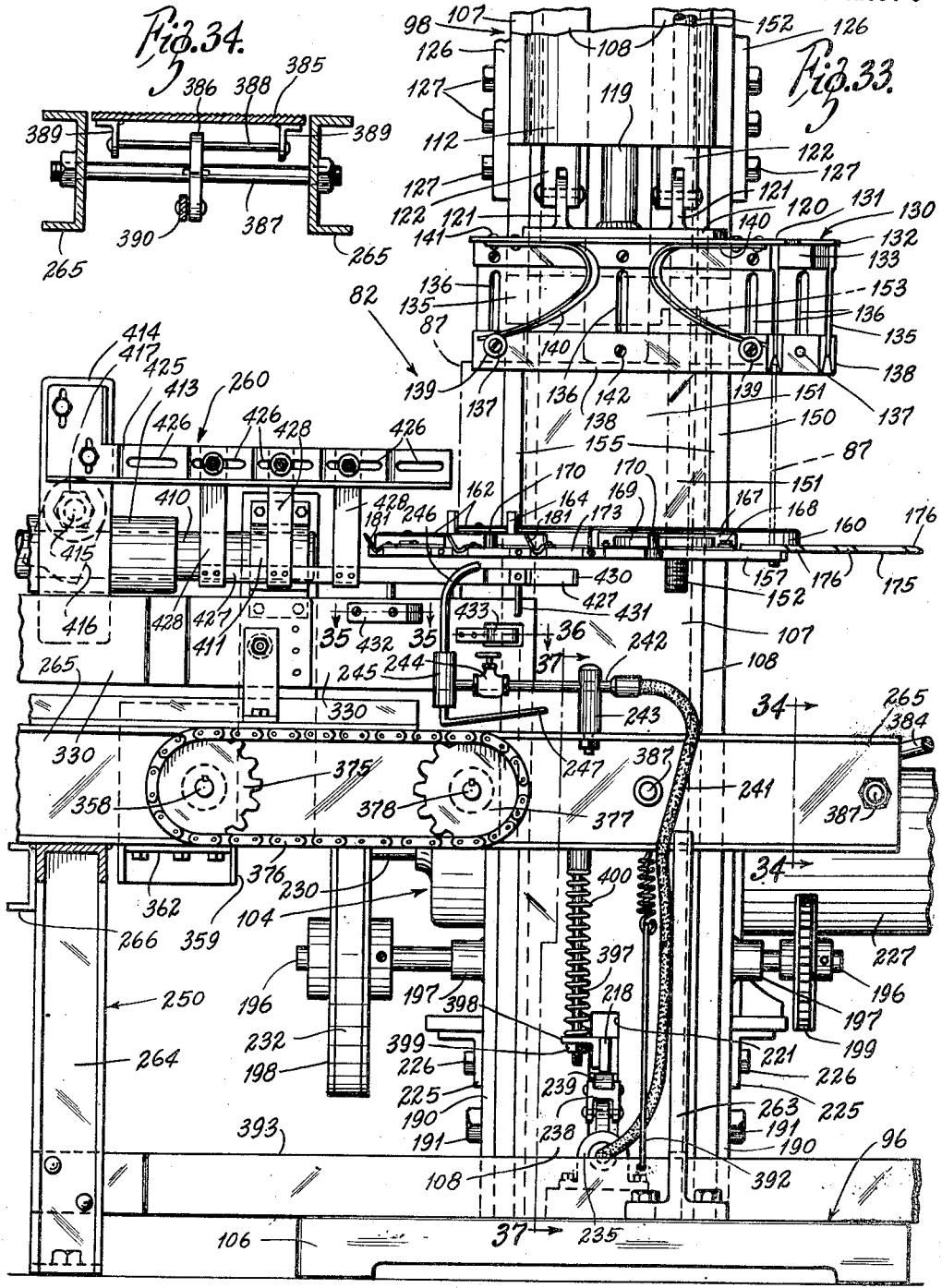

INVENTOR:
SIMON E. SCHROEDER,
BY Kingsland, Rogers & Ezell
ATTORNEYS

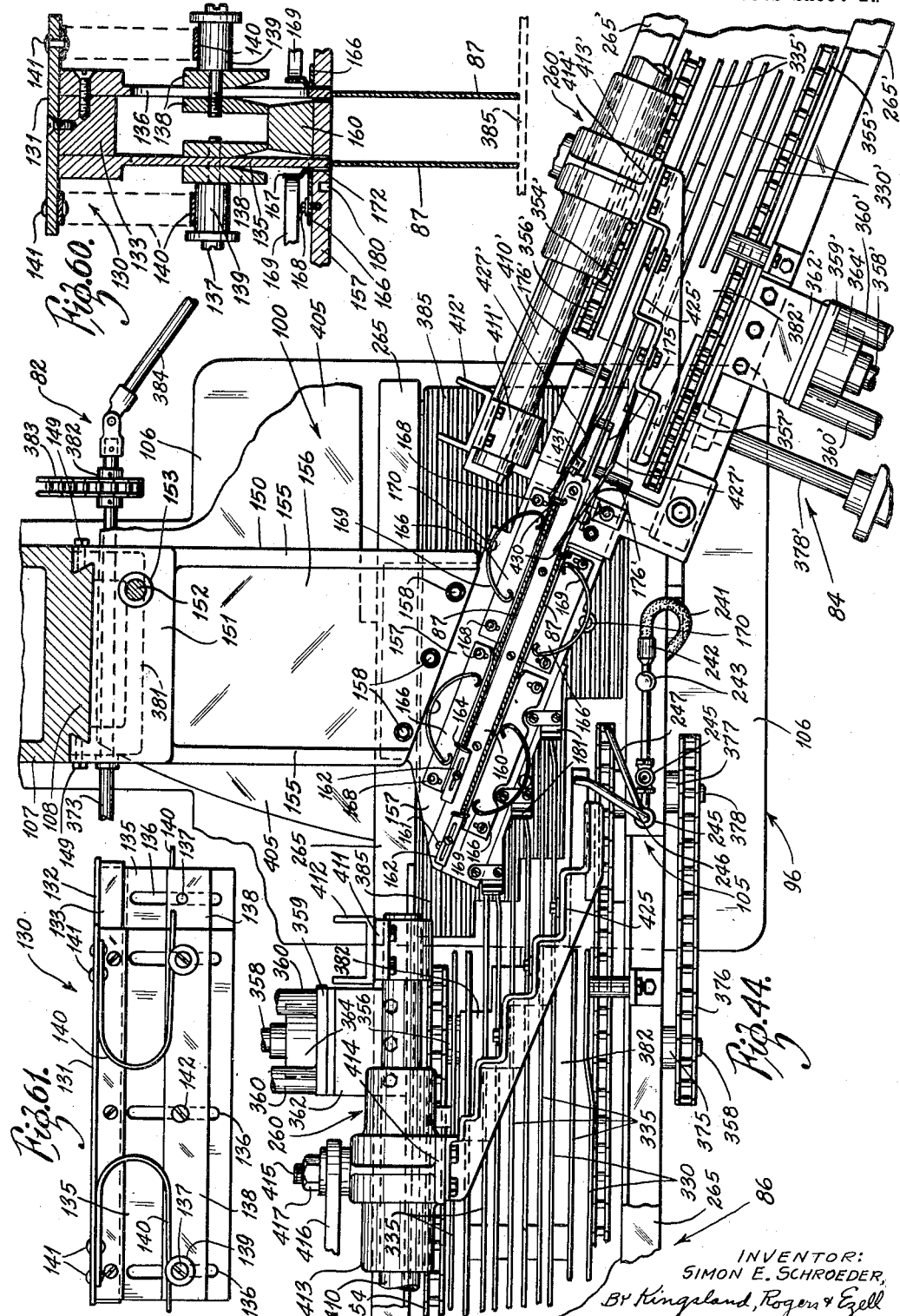

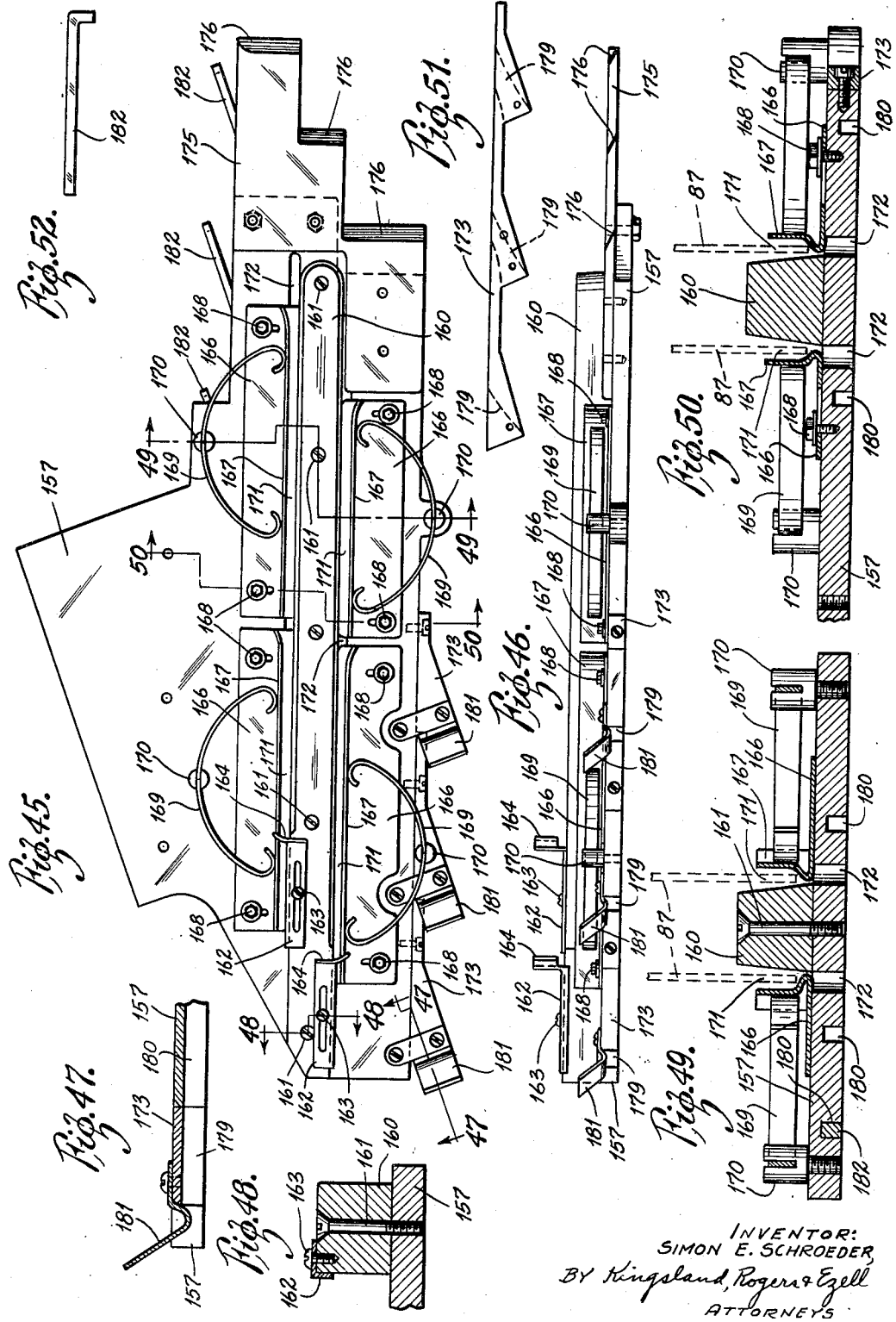

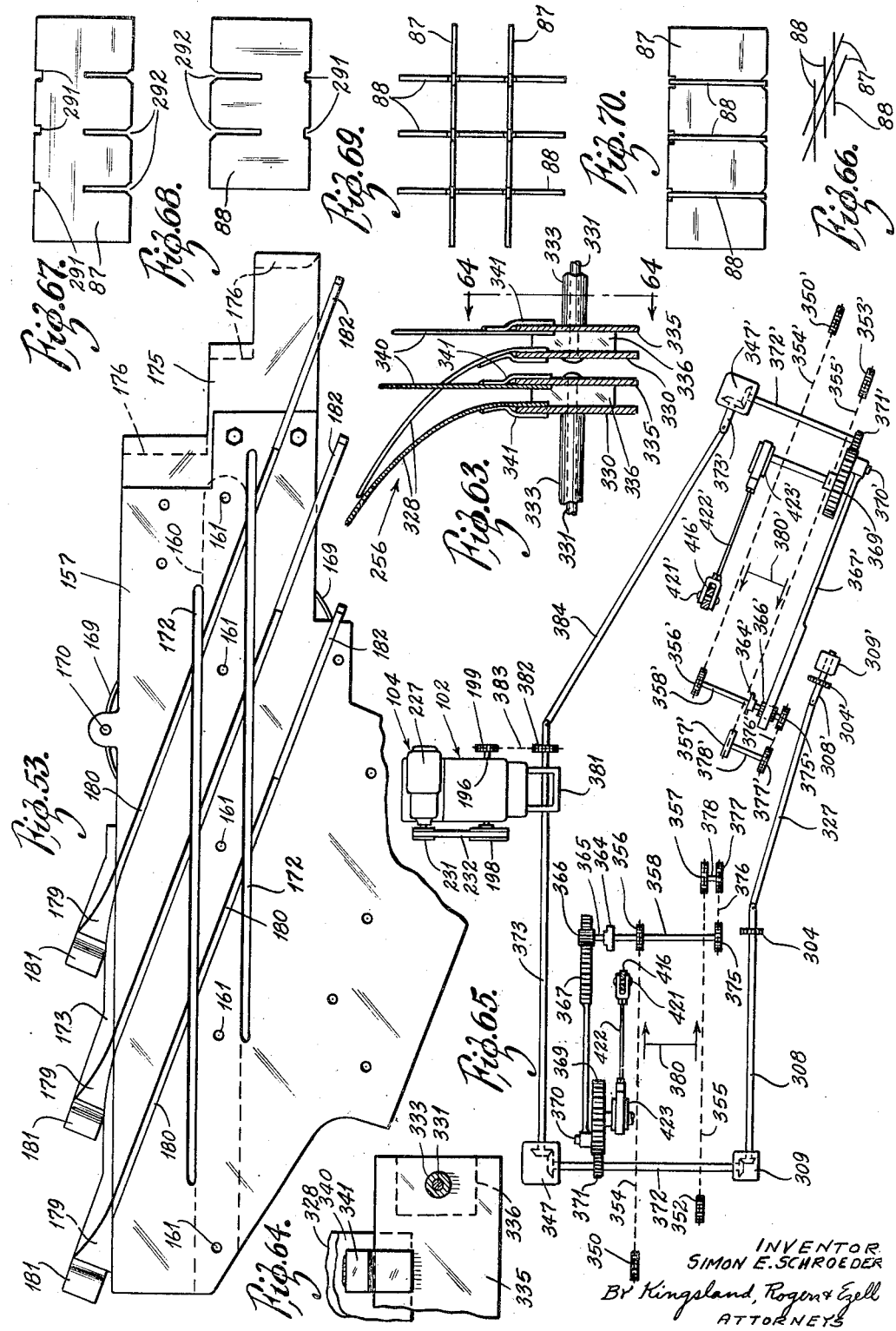

United States Patent Office 2,767,625
Patented Oct. 23, 1956

2,767,625

APPARATUS FOR UNIVERSAL ASSEMBLING OF PARTITION STRIPS

Simon E. Schroeder, Oshkosh, Wis., assignor, by mesne assignments, to Standard Brands Incorporated, New York, N. Y., a corporation of Delaware Application August 6, 1951, Serial No. 240,511

9 Claims. (Cl. 93—37)

The present invention relates generally to methods of and machines for automatically assembling preformed partition strips into partition assemblies, and more particularly to a novel method of forming partition assemblies and to a novel assembling or nesting machine which is adapted to automatically convert preformed partition strips of various selected dimensions including different thicknesses and of various selected specific kinds and forms of material into complete partition assemblies.

Broadly, the present novel method of forming partition assemblies embraces handling and nesting groups of preformed partition strips of various sizes and specific forms of material at an angle other than ninety degrees. The present novel automatic assembling machine includes a centrally disposed nesting mechanism and right-hand and left-hand automatic partition strip feeding mechanisms which are disposed at a selected angle to each other, which mechanisms are formed and related so as to produce a universal partition assembly forming machine, thereby providing a highly satisfactory solution to the problem long confronting the partition assembly forming art, namely, the need of a universal automatic partition assembling machine. Each feeding mechanism receives preformed partition strips of selected sizes and specific forms of material, herein illustrated as hand fed stacks, although such may be otherwise provided, and each feeding mechanism functions in a predetermined way to dispose a selected number of the preformed partition strips edgewise and in a grouped relation, and to feed the edgewise disposed partition strips in the grouped relation to the nesting mechanism for nesting with a group of edgewise disposed partition strips fed to the nesting mechanism by the other strip feeding mechanism. The nesting mechanism and the two strip feeding mechanisms are operated in cooperative timed relation to effect a maximum number of partition assemblies. The present invention includes the novel relationship of the two feeding mechanisms with the nesting mechanism, and the novel features of the feeding and nesting mechanisms.

Therefore, an object of the present invention is to provide an automatic assembling machine which has, in effect, universal application in the formation of partition assemblies.

Another object is to provide a novel automatic assembling machine which is adjustable for effecting assembling of partition assemblies of selected numbers of pieces, of selected dimensions, and of selected specific materials.

Another object is to provide a novel automatic assembling machine which will handle partition strips of corrugated paper board, partition strips of solid paper board, and partition strips of other paper boards.

Another object is to provide a novel method of forming complete partition assemblies in which partition strips are nested at an angle other than ninety degrees.

Another object is to provide a novel method of forming complete partition assemblies in which preformed partition strips are handled for a portion of the movement from stacked strips to completed partition assemblies in edgewise disposed stepped groups.

Another object is to provide a novel automatic assembling machine which incorporates novel mechanisms for moving successive sets of groups of edgewise disposed off-set related partition strips to and into a nesting zone and into complete partition assemblies while in the off-set relationship.

Another object is to provide a novel automatic assembling machine which is constructed to reduce to a minimum change-over time required in making essential adjustments when changing from one size or form of partition strip to another.

Another object is to provide in an automatic assembling machine a novel nesting mechanism and novel partition strip feeding mechanisms.

Another object is to provide in an automatic assembling machine a novel plunger assembly for the nesting mechanism thereof.

Another object is to provide in an automatic assembling machine a novel partition strip receiving and positioning assembly for the nesting mechanism thereof which receives both the top and bottom partition strips in vertically spaced relation and retains them in position for nesting.

Another object is to provide in an automatic assembling machine a novel hopper and hopper discharge assemblies for the feeding mechanisms thereof which feed partition strips to a conveyor assembly.

Another object is to provide in an automatic assembling machine a novel conveyor assembly for each feeding mechanism which is constructed to slide successive groups of edgewise off-set partition strips towards the nesting zone of the nesting mechanism of said machine.

Another object is to provide in an automatic assembling machine a novel partition strip pusher unit for each feeding mechanism thereof which functions to pick up the successive groups of partition strips from the conveyor assembly and to push them into the nesting zone of the nesting mechanism of said machine.

Other objects are to provide a novel automatic assembling machine which incorporates efficiency of operation, which has a high production capacity, which is of rugged construction thereby reducing repair and maintenance costs to a minimum, which produces superior partition assemblies economically, and which requires only the part-time services of one attendant.

The foregoing and other objects and advantages are apparent from the following description taken with the accompanying drawings, in which:

Fig. 1 is a top plan view of the present novel automatic assembling machine, the nesting mechanism, the right-hand feeding mechanism, and the left-hand feeding mechanism being disposed in operative relationship, the left-hand feeding mechanism being at right angles to the nesting mechnaism, and the right-hand feeding mechanism being at an angle of approximately fifteen degrees to the left-hand feeding mechanism, and, hence, at one hundred and five degrees to the nesting mechanism (Sheet 1);

Fig. 2 is a panoramic front elevational view of the present assembling machine as seen from the line 2—2 of Fig. 1, a portion of the right-hand feeding mechanism being omitted for conservation of space (Sheet 2);

Fig. 3 is a panoramic rear elevational view of the present assembling machine as seen from substantially the line 3—3 of Fig. 1, a portion of the right-hand feeding mechanism being omitted for conservation of space (Sheet 3);

Fig. 4 is an enlarged end elevational view of the left-hand feeding mechanism and the nesting mechanism as viewed from substantially the line 4—4 of Fig. 1 (Sheet 4);

Fig. 5 is an enlarged vertical cross-sectional view through the left-hand feeding mechanism taken substantially on the line 5—5 of Fig. 1 (Sheet 5);

Fig. 6 is a fragmentary vertical cross-sectional view taken on substantially the line 6—6 of Fig. 5 (Sheet 5);

Figure 42:
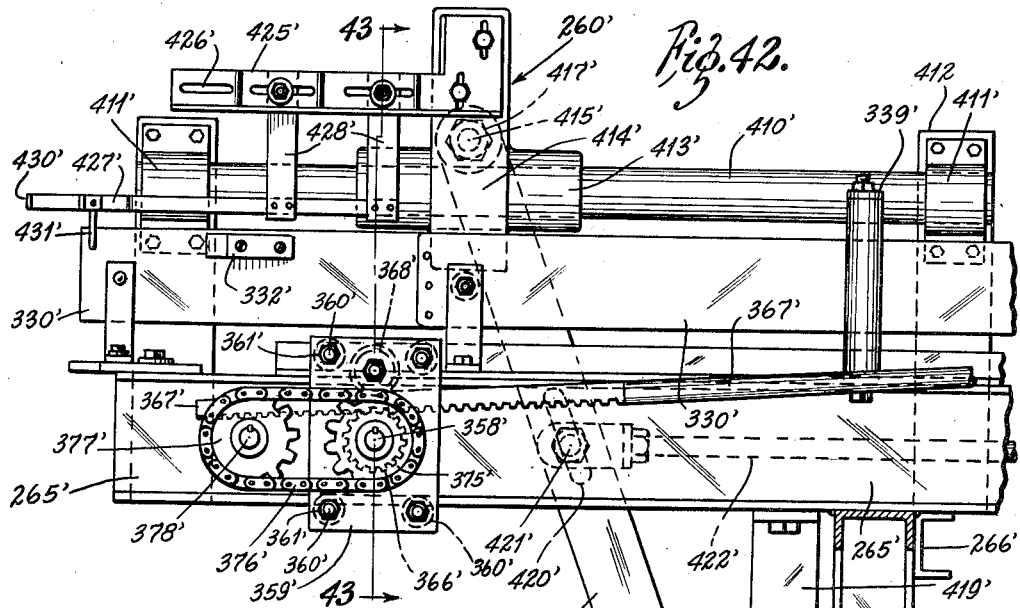
Figure 43:
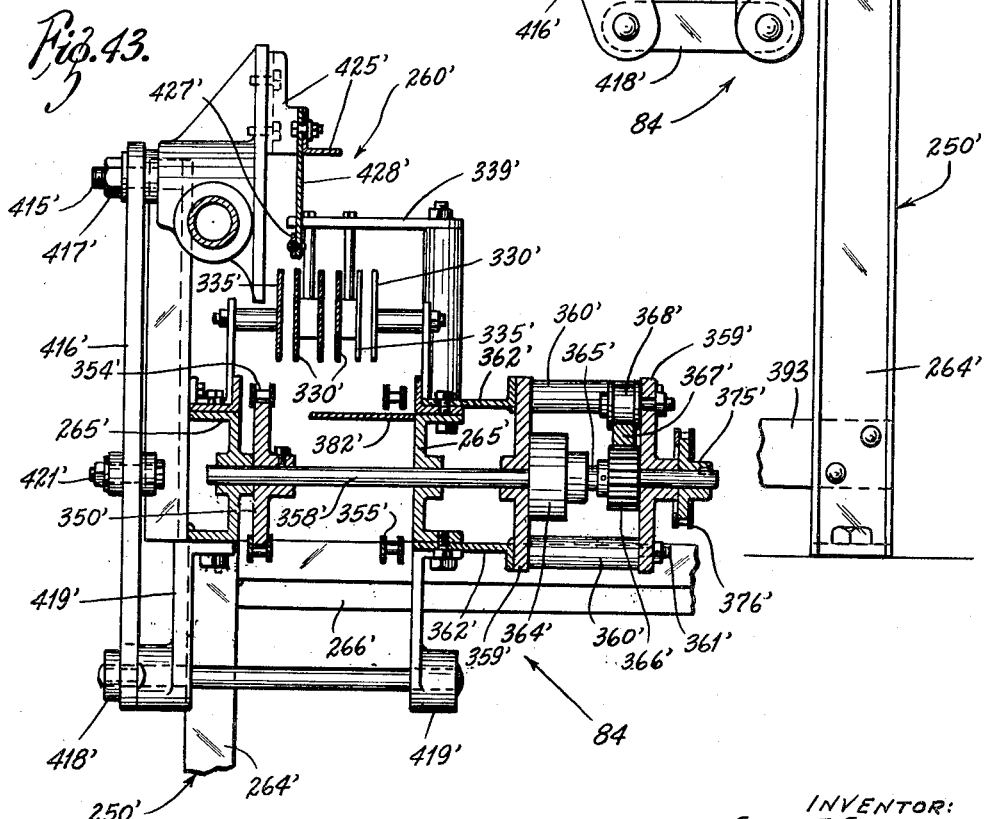

Figs. 7, 8, 9 and 10 are further enlarged vertical cross-sectional views on substantially the lines 7—7, 8—8, 9—9, and 10—10 of Fig. 6 (Sheet 5);

Fig. 11 is a further enlarged vertical transverse cross-sectional view taken on substantially the line 11—11 of Fig. 6, a stack of preformed partition strips being indicated in broken lines with the bottommost one illustrated as approaching the feeding rollers (Sheet 6);

Fig. 12 is a view similar to Fig. 11, but illustrating a partition strip between the feeding rollers and showing the transversely reciprocable hopper discharge assembly in substantially ready position (Sheet 6);

Fig. 13 is a longitudinal cross-sectional view taken on substantially the line 13—13 of Fig. 4 (Sheet 7);

Fig. 14 is a further enlarged top plan view of the left or free end of the left-hand feeding mechanism, the motor being omitted and supporting members being in section for clarity (Sheet 4);

Fig. 15 is a further enlarged horizontal cross-sectional view on substantially the line 15—15 of Fig. 4 (Sheet 4);

Fig. 16 is a further enlarged horizontal cross-sectional view, partly in top plan, taken on substantially the line 16—16 of Fig. 4, a removable two-sided cover plate being omitted for clarity (Sheet 8);

Fig. 17 is a vertical cross-sectional view on substantially the line 17—17 of Fig. 16, the cover plate being omitted for clarity (Sheet 8);

Fig. 18 is a vertical cross-sectional view at right angles to Fig. 17, taken on substantially the line 18—18 of Fig. 16, the cover plate being omitted for clarity (Sheet 8);

Fig. 19 is a horizontal cross-sectional view on substantially the line 19—19 of Fig. 4 (Sheet 8);

Fig. 20 is an enlarged end elevational view taken on substantially the line 20—20 of Fig. 1, showing the free or right-hand end of the right-hand feeding mechanism (Sheet 6);

Fig. 21 is an enlarged top plan view of the right or free end portion of the right-hand feeding mechanism, the motor and supporting members being omitted for clarity, a view corresponding to Fig. 14 (Sheet 6);

Fig. 22 is a further enlarged fragmentary horizontal cross-sectional view taken on substantially the line 22—22 of Fig. 11 (Sheet 5);

Fig. 23 is a view similar to Fig. 22, illustrating the same relative parts for the right-hand feeding mechanism (Sheet 6);

Fig. 24 is an enlarged plan view of a portion of the partition strip conveyer chain assembly of the left-hand feeding mechanism (Sheet 5);

Fig. 25 is a view similar to Fig. 24 illustrating the comparable construction of the right-hand feeding mechanism (Sheet 5);

Fig. 26 is an enlarged view of a portion of the left-hand feeding mechanism which is shown in Fig. 3, portions being broken away and in section for clarity of illustration (Sheet 3);

Fig. 27 is a transverse vertical cross-sectional view on substantially the line 27—27 of Fig. 26 (Sheet 1);

Fig. 28 is an enlarged detail side elevational view of one of the resilient pusher-fingers forming part of each partition strip pusher unit (Sheet 3);

Fig. 29 is a horizontal cross-sectional view taken on substantially the line 29—29 of Fig. 28, showing the pusher-finger in top plan (Sheet 3);

Fig. 30 is a vertical cross-sectional view on substantially the line 30—30 of Fig. 29 (Sheet 3);

Fig. 31 is an enlarged side elevational view of a slidable sleeve bracket which appears in Fig. 3 and which forms a part of each of the strip feeding mechanisms (Sheet 3);

Fig. 32 is a right end elevational view of the sleeve bracket of Fig. 31 Sheet 3);

Fig. 33 is an enlarged front elevational view of the nesting mechanism, the top portion being broken away for conservation of space, the right end portion of the left-hand feeding mechanism being illustrated in conjunction with the nesting mechanism, the left end portion of the right-hand feeding mechanism being omitted for clarity as is the chain to the sprocket illustrated in the lower right-hand corner of the view (Sheet 9);

Fig. 34 is a vertical cross-sectional view on substantially the line 34—34 of Fig. 33 (Sheet 9);

Fig. 35 is a further enlarged horizontal cross-sectional view on substantially the line 35—35 of Fig. 33 (Sheet 9);

Fig. 36 is a further enlarged horizontal cross-sectional view taken substantially on the line and single arrow 36 of Fig. 33 (Sheet 9);

Fig. 37 is a vertical transverse cross-sectional view taken on substantially the line 37—37 of Fig. 33 (Sheet 7);

Fig. 38 is a fragmentary elevational view as seen from substantially the line 38—38 of Fig. 37 (Sheet 7);

Fig. 39 is a vertical longitudinal cross-sectional view on substantially the line 39—39 of Fig. 37, the partition strip supporting plate being in its lower position (Sheet 7);

Fig. 40 is a cross-sectional view similar to Fig. 39 illustrating the partition strip supporting plate in elevated position (Sheet 7);

Fig. 41 is a further enlarged fragmentary top plan view of one end of the partition strip supporting plate (Sheet 7);

Fig. 42 is a further enlarged side elevational view of the left end portion of the right-hand feeding mechanism (Sheet 10);

Fig. 43 is a vertical transverse cross-sectional view on substantially the line 43—43 of Fig. 42 (Sheet 10);

Fig. 44 is an enlarged horizontal cross-sectional view taken on substantially the line 44—44 of Fig. 2, illustrating the overlapping inner ends of the two feeding mechanisms in top plan (Sheet 11);

Fig. 45 is a top plan view on a greatly enlarged scale of a partition strip receiving assembly forming part of the nesting mechanism disposed at the juncture of the partition strip feeding mechanisms (Sheet 12);

Fig. 46 is a front elevational view of the partition strip receiving assembly shown in Fig. 45 (Sheet 12);

Figs. 47, 48, 49 and 50 are still further enlarged vertical cross-sectional views taken on substantially the lines 47—47, 48—48, 49—49, and 50—50, respectively, of Fig. 45 (Sheet 12);

Fig. 51 is a top plan view of a guide element (Sheet 12);

Fig. 52 is a side elevational view of a stop member per se, one being provided to limit the movement of each partition strip fed to the nesting mechanism by the left-hand feeding mechanism (Sheet 12);

Fig. 53 is a bottom plan view of the partition strip receiving assembly of Fig. 45 (Sheet 13);

Fig. 54 is a further enlarged front elevational view of a partition strip depresser unit forming a part of the nesting mechanism (Sheet 2);

Fig. 55 is an end elevational view of the unit of Fig. 54 (Sheet 2);

Fig. 56 is a bottom plan view thereof (Sheet 2);

Figs. 57 and 58 are further enlarged vertical cross-sectional views taken on substantially the lines 57—57 and 58—58, respectively, of Fig. 54 (Sheet 2);

Fig. 59 is a vertical cross-sectional view combining Fig. 57 and the central portion of Fig. 50, illustrating the partition strip depresser unit near the end of its downward stroke just prior to collapsing action thereof (Sheet 6);

Fig. 60 is a vertical cross-sectional view similar to Fig. 59, illustrating the partition strip depresser unit in collapsed position at the completion of its downward stroke (Sheet 11);

Fig. 61 is a front elevational view similar to Fig. 54 illustrating the partition strip depresser unit in collapsed position (Sheet 11);

Fig. 62 is an enlarged front elevational view of a portion of a ram or plunger assembly forming part of the nesting mechanism and of which the partition strip depresser unit forms a part and is secured thereto (Sheet 2);

Fig. 63 is a further enlarged vertical cross-sectional view illustrating details of the left-hand feeding mechanism and referenced upon Fig. 5 (Sheet 13);

Fig. 64 is a vertical longitudinal cross-sectional view taken on substantially the line 64—64 of Fig. 63 (Sheet 13);

Fig. 65 is a schematic layout in top plan of the coordinated driving members showing how all moving parts of the feeding mechanisms of the present partition assembling machine, with the exception of the continuously rotating aligned roller assemblies of each strip feeding mechanism, are actuated from a main power source (Sheet 13);

Fig. 66 is a diagrammatic plan view of a partition assembly at the end of the assembly operation and immediately prior to ejection from the present machine (Sheet 13);

Fig. 67 is a side elevational view of a top partition strip which exemplifies those fed to the nesting mechanism by the right-hand feeding mechanism (Sheet 13);

Fig. 68 is a side elevational view of a bottom partition strip which exemplifies those fed to the nesting mechanism by the left-hand feeding mechanism (Sheet 13);

Fig. 69 is a top plan view of a partition or divider assembly typical of such produced by the present machine (Sheet 13); and Fig. 70 is a side elevational view of the partition assembly shown in Fig. 69 (Sheet 13).

Referring to the drawings more particularly by reference numerals, 80 indicates generally an automatic assembling machine constructed in accordance with the teachings of the present invention. Considered from the broadest viewpoint, the present novel assembling machine 80 comprises a centrally disposed nesting mechanism 82, a right-hand automatic partition strip feeding mechanism 84, and a left-hand automatic partition strip feeding mechanism 86, the three mechanisms being cooperatively actuated in timed relation to automatically produce partition assemblies from stacks of preformed partition strips. As illustrated in the drawings, the left-hand feeding mechanism 86 is at right angles to the nesting mechanism 82, while the right-hand feeding mechanism 84 is disposed at an angle of substantially fifteen degrees to the feeding mechanism 86, and, hence, at an angle of one hundred and five degrees to the nesting mechanism 82. It has been determined that the angle between the two feeding mechanisms 84 and 86 for optimum performance in the production of partition assemblies regardless of the particular size or type of paper board is as stated, although this optimum angular relationship may be varied for particular installations. It is to be noted that in the illustrated assembling machine 80, the two feeding mechanisms 84 and 86 are similar, but not identical. The right-hand feeding mechanism 84 is constructed to handle a maximum of three top partition strips 87 exemplified by Fig. 67, whereas, the left-hand feeding mechanism 86 is constructed to handle a maximum of five bottom partition strips 88, exemplified in Fig. 68. Manifestly, the maximum capacity of each of the feeding mechanisms 84 and 86 may be changed from that shown without departing from the scope of the invention.

To facilitate ready understanding of the construction of the present assembling machine 80, the nesting mechanism 82, the feeding mechanism 86, and the feeding mechanism 84 are described in detail below consecutively in the order mentioned. An "operation" section concludes the description.

The nesting mechanism 82 (Figs. 1–4, 16–19, 33, and 45–60) includes a supporting structure 96, a vertically adjustable ram or plunger assembly 98, a vertically adjustable partition strip receiving assembly 100, a power transmission assembly 102, a combination motor and gear reduction unit 104, and an air-type completed partition strip ejector unit 105.

More particularly considering the several assemblies and units which combine to form the novel nesting mechanism 82, the supporting structure 96 includes a base platform 106 to which is secured by suitable bolts, welding, or otherwise, a vertical column or standard 107 of a form and cross section clearly shown in Figs. 4, 15 and 19. The vertical standard 107, hence, is of channel or U-cross section and includes a forwardly extending guideway 108 or track which adjustably supports the ram or plunger assembly 98 and the partition strip receiving assembly 100, as is pointed out below. The track 108 runs the total length of the vertical column 107.

The ram or plunger assembly 98 (Figs. 1–4, 19, 33, and 54–60) includes a supporting bracket 112 of a configuration clearly shown in Figs. 2, 4 and 19. The supporting bracket 112 includes a thick end wall 113 which has an exterior surface complementing and riding upon the track 108, being secured in selected position in respect thereto by suitable setscrews 114. For vertical adjustment of the bracket 112, a vertical aperture is provided in the wall 113 for the full height thereof, which receives the lower end of a threaded shaft 115 which threadedly engages a collar 116 welded or otherwise secured to the top of the wall 113. The shaft 115 is rotatably suspended from a plate 117 bolted or otherwise secured to the top of the vertical standard 107, and is squared at the upper end to receive a crank handle such as the one illustrated in broken lines in Fig. 2. Manifestly, to raise or to lower the bracket 112, it is but necessary to release the setscrews 114, and then crank the shaft 115 in the desired direction, the setscrews 114 being tightened after the adjustment. If desired, the aperture in the wall 113 may be threaded for engagement by the shaft 115.

The bracket 112 includes a forwardly disposed integral boss 118 which guidingly receives for vertical reciprocation a shaft 119 (Figs. 2, 4, 19, 33, and 62). A horizontally disposed plate 120 is welded or otherwise secured to the lower end of the shaft 119. A pair of vertically extending apertured spaced feet 121 is welded or otherwise secured to the upper surface of the plate 120 to each of which is pivotally connected a link 122. As is clear from Figs. 4 and 62, the feet 121 are disposed at each side of the shaft 119. The bifurcated free end of an actuating lever 124 is pivotally connected to the two links 122, the lever 124 extending through the web of the column 107 and having pivotal bearing support at 125 upon the free ends of a pair of opposed supporting plates 126 which are secured by suitable bolts 127 to the sides of the supporting bracket 112, as is clear from Figs. 4 and 19. An actuating shaft 129 is pivotally connected at 130 to the actuating lever 124 forwardly of the pivotal mounting 125 of the latter, the actuating shaft 129 being connected for reciprocation to the power transmission assembly 102 in the manner described below.

The ram or plunger assembly 98 also includes a partition strip depresser unit 130 which is welded or otherwise secured to the lower face of the plate 120 (Figs. 2, 4, 33, and 54–61). The partition strip depresser unit 130 includes a horizontal top plate 131 of generally rectangular form, having a notch 132 formed at one corner to the underside of which is secured by suitable screws an elongated block member 133 which is disposed centrally of the plate 131. Spaced depresser plates 135 are secured by suitable screws to the sides of the block member 133. The plates 135 are offset from each other longitudinally of the plate 131, as is clear from an inspection of Fig. 56. Each plate 135 includes three longitudinally spaced vertical slots 136, the outermost pairs of which slidably receive for vertical reciprocation bolts 137. Each bolt 137 supports a pair of partition strip guide strips 138 and a flanged spool 139, the bolts 137 threadedly engaging the innermost guide strip 138 in each instance. The guide strips 138 are bevelled along the lower inner edges to provide, in effect, guide funnels for the reception of the upper edges of partition strips, as is clear from an inspection of Fig. 57. A leaf spring 140 engages towards its free end with each of the spools 139 thereby biasing the same, together with the guide strips 138 and the supporting bolts 137, to the positions of Fig. 57, the leaf springs 140 being anchored by rivets 141 or the like to the underside of the plate 131. A guide bolt 142 extends through each pair of guide strips 138 and rides in the central vertical slots 136, as is clear from Figs. 54 and 56. Collapsed positions of the partition strip depresser unit 130 are shown in Figs. 60 and 61, Fig. 59 also showing the depresser unit 130 just after collapsing action is initiated through the continued downward movement of the spaced plates 135. Manifestly, reciprocation of the plunger assembly 98 will depress supplied edgewise disposed top partition strips 87 into nesting relation with properly located edgewise disposed bottom partition strips 88.

The partition strip receiving assembly 100 is supported from the upright standard 107 with the operative elements thereof disposed directly beneath the partition strip depresser unit 130 (Figs. 2, 4, 15, 33, 44–53, 60, and 61). A supporting bracket 150 is provided which is of a cross section clearly shown in Figs. 4, 15, and 33, and includes a vertical end wall 151 of substantial thickness which is formed externally complementary to and engages the track 108 of the upright standard 107. The bracket 150 is vertically adjustably mounted on the standard 107 by means of a threaded shaft 152 which is suspended from the plate 117 and which threadedly engages a collar 153 welded or otherwise secured to the top surface of the wall 151. Setscrews 149 releasably secure the bracket 150 in selected position. A vertical opening is provided through the wall 151 to receive the portion of the shaft 152 extending below the threaded collar 153. Manifestly, the opening receiving the shaft 152 may be threaded if desired. The shaft 152 extends through a vertical opening in the wall 113 of the bracket 112, as is indicated in Figs. 2 and 3. The upper end of the shaft 152 is squared to receive an operating crank such as that indicated in broken lines in Fig. 2. The bracket 150 includes spaced vertical side walls 155 and a horizontal bottom 156. A plate 157 of irregular outline, as is clear from Figs. 45 and 53, is secured by bolts 158 to the free end of the bottom 156 of the bracket 150 (Fig. 44). The main portion of the plate 157 is disposed at an obtuse angle of one hundred twelve and a half degrees to the walls 155 of the bracket 150 and, hence, to the nesting mechanism 82. An elongated block 160 of substantial thickness is secured by screws 161 to the upper surface of the plate 157 substantially centrally of the elongated portion thereof (Figs. 44–46, and 48–50). As is clear from Figs. 45, 49, and 50, the block 160 is bevelled and rounded at one end and is bevelled for the major portion of the length thereof. At the non-bevelled end thereof, the block 160 adjustably supports two stop members 162 which are secured in selected adjusted positions by screws 163. Each stop member 162 includes a vertical stop face 164 against which partition strips are adapted to come to rest in the operative use of the machine 80. At each side of the block 160 are elongated plates 166, each of which has an upstanding flange 167 flared at the partition strip receiving end to facilitate reception of partition strips. Each plate 166 is loosely mounted upon a pair of spaced bolts 168 which threadedly engage the plate 157 and extends through transverse slots in the plates 166, as is clear from Fig. 45. A bowed leaf spring 169 mounted in a post 170 constantly resiliently urges each plate 166 towards the block 160 to define therewith a channel 171 adapted to receive the lower edges of top partition strips 87. As is clear from Figs. 49 and 50, the vertical flanges 167 of the plates 166 are offset inwardly in the upper portion thereof and are formed with a downwardly sloping surface adjacent the bottom portion thereof so that downward pressure applied to the top partition strips 87 will readily effect movement of the plates 166 away from the block 160 to permit the top partition strips to be driven downwardly through elongated slots 172 provided in the plate 157 at each side of the block 160. The plates 166 are shown in outwardly moved positions in Figs. 59 and 60. Three of the spring receiving posts 170 are threadedly mounted in the plate 157 and the fourth in a guide element support 173 (Fig. 51) detachably secured by suitable bolts to the outermost edge of the plate 157 (Fig. 45). To the right-end of the plate 157 is detachably secured a partition strip lifting or elevating plate 175 which is of the form clearly shown in Figs. 45 and 46 and which includes bevelled offset front edge segments 176. The plate 175 is required in order to raise top partition strips 87 to the elevation of the lower portion of the vertical flanges 167 of the plates 166, as is clear from an inspection of Figs. 49 and 50.

The bottom face of the plate 157 includes three parallel diagonally disposed grooves 180 which are adapted to receive the upper edges of bottom partition strips 88 (Figs. 49, 50 and 53). The guide element 173 has flared grooves 179 which lead into the grooves 180. At the partition strip receiving end of each of the grooves 180 is a resilient leaf spring 181 which is secured by suitable screws to the guide element 173 and to the plate 157, as is clear from Fig. 45 taken with Figs. 46 and 47. The leaf springs 181 contact the upper edges and reduce the speed of the bottom partition strips 88 as they are fed into the grooves 180 and prevent rebound. At the end of each groove 180 remote from the springs 181 is adjustably mounted a stop member 182 which defines the limit of travel of the bottom partition strips 88. The stop members 182 snugly fit the grooves 180 and require no additional securing means such as screws, although such may be employed if desired. It is manifest that the partition strip receiving assembly 100 is disposed in relation to the feeding mechanisms 84 and 86 to receive top partition strips 87 from the former and bottom partition strips 88 from the latter for subsequent nesting and discharge as a partition assembly from the machine 80.

The power transmission assembly 102 and the combination motor and gear reduction unit 104 of the nesting mechanism 82 are disposed in tandem rearwardly of the upright standard 107 as is clear from Figs. 1 and 4. The power transmission assembly 102 is supported by and between two heavy plates 190 which are secured at the forward edges by bolts 191 to the flanges of the upright standard 107 and which are secured in spaced relation at the rearward edges by upper and lower shafts 192 having reduced threaded ends receiving suitable nuts 193 (Figs. 1, 4, 16–18, 33, and 65). A bottom plate 194 is secured to the base 106 by suitable bolts 195. A removable cover (not shown) which extends along the top and rear of the plates 190 cooperates with the plates 190, the standard 107, and the bottom plate 194 to provide a closed casing. A driven shaft 196 extends completely through the two plates 190 and is rotatably mounted in bearings 197 formed integral with or secured to the outer sides thereof by any suitable means, such as welding. A pulley 198 is secured by a suitable key and slot to one externally located end of the shaft 196 and a sprocket 199 is secured by suitable setscrews to the other external end thereof. A small gear 200 is secured by a suitable setscrew or the like to the shaft 196 between the plates 190 which is in mesh with a much larger gear 201 freely rotatably mounted upon a shaft 202 having reduced threaded ends extending through and supported by the plates 190 which receives securing nuts 203. A cam track disk 204 is formed integral with the large gear 201, although the gear 201 and cam track disk 204 may be separately formed and secured together by any means, such as bolts or the like. A continuous cam track 205 is provided in the free vertical surface of the cam track disk 204 of a form and cross section clearly shown in Figs. 17 and 18. A cam track wheel 206 rolls in the cam track 205 and is supported by a lever 207 rotatably mounted at one end upon a shaft 208 supported by the plates 190. Suitable adjustable collars 209 prevent movement of the lever 207 along the shaft 208 out of the selected adjusted position thereof. Specifically, the cam track wheel 206 is freely rotatable upon a suitable pin 210 supported by the lever 207 intermediate the ends thereof. The above-mentioned shaft 129 is pivotally connected at 212 to the free end of the lever 207, as is clear from Figs. 17 and 18. Manifestly, as the cam disk 204 is rotated, the shaft 129 will be reciprocated as the cam track wheel 206 follows the cam track 205.

A cam member 215 having a cam extension 216 is secured by suitable bolts to the free face of the cam track disk 204 for rotation therewith. A cam follower roller 217 is freely rotatably mounted on one end of an elongated lever 218 in following engagement with the cam 215 and its cam extension 216. The lever 218 is rockably mounted upon a shaft 219 which is suitably supported by the flanges of the upright standard 107, being maintained in position by suitable nuts. Setscrew collars 220 maintain the lever 218 in selected position. The lever 218 extends forwardly through an opening 221 in the web of the standard 107 for intermittent actuation of an air cylinder ejector unit more particularly described below.

The combination motor and gear reduction unit 104 is disposed rearwardly of the power transmission assembly 102 and is mounted upon a supporting base 225 of a form clearly shown in Figs. 3 and 4. The supporting base 225 is secured by suitable bolts 226 to the plates 190 and is bolted to the supporting surface upon which the machine 80 is disposed. An electric motor 227 is mounted above reduction gearing 228, both of which are supported by and housed within a common casing 229. A power take-off shaft 230 extends to one side of the unit 104 to which is secured by a suitable key and groove a pulley 231. A belt 232 is trained around the pulley 231 and the previously mentioned pulley 198. Power is supplied to the motor 227 from a suitable conventional source which is interrupted by a standard push button on-off control switch (not shown). It is to be understood that the combination unit 104 is of standard construction, and that it furnishes the power for the movement of all movable elements with the exception of the continuously rotating rollers of both feeding mechanisms 84 and 86 described below. The layout of the mechanically driven elements is diagrammatically illustrated in Fig. 65 and is more particularly described below.

The air ejector unit 105 is best illustrated in Figs. 2, 4, 33, 37, and 44. An air cylinder valve 235 of standard construction is mounted on the base platform 106 by suitable bolts, being directly disposed upon a block which is welded or otherwise secured to the base platform 106, and is connected by an air line 236 to a source of air under pressure. A normally extended operating plunger 237 is provided for opening and closing of the valve 235, the plunger 237 in its spring-biased outward position opening the valve 235. A lever 238 is pivotally connected to the top of the valve 235 and extends across the top of the operating plunger 237. A roller 239 is rotatably mounted at the free end of the lever 238 which is normally maintained depressed by contact with the free end of the above described lever 218. A compression spring 240 biases the lever 238 upwardly out of engagement with the plunger 237 upon release of the roller 239 upon rocking movement of the lever 218. The free end of the lever 218 is rocked up and back to normal rest position once per partition assembly forming cycle of the machine 80. An air line 241 runs from the valve 235 to a pipe segment 242 supported by a post 243 mounted on a forward channel member more specifically referred to below (Fig. 33). The pipe segment 242 is connected into a hand valve 244 which is, in turn, connected into a vertical fitting 245. An upper nozzle 246 and a lower nozzle 247 are connected into the ends of the fitting 245 and are directed beneath the plate 157 in a manner to eject completed partition assemblies in timed relation with the formation and release thereof.

Referring in detail to the left-hand automatic partition strip feeding mechanism 86 (Figs. 1–14, 22, 24, 26–41, 44, and 63–65); it includes supporting structure 250, a hopper assembly 252, a hopper discharge assembly 254, an edgewise disposing unit 256, a conveyer assembly 258, and a pusher unit 260.

The supporting structure 250 for the feeding mechanism 86 includes four upright members 264 of channel cross section, which are bolted to the surface supporting the machine 80, and a heavy transversely disposed plate 263 bolted to the base platform 106 (Figs. 3, 5, 33 and 37). Transverse members 266 are welded to the vertical members 264 adjacent the tops thereof. Two large spaced longitudinal frame members 265 of channel cross section are disposed on and are welded to the transverse members 266 and plate 263, one member 265 also being disposed over two of the vertical members 264. The frame members 265 both solidify the supporting structure 250 and support the conveyer assembly 258, which is more particularly described below. It is to be observed that the two longitudinal channel members are relatively close together (Figs. 5 and 37).

The hopper assembly 252 of the feeding mechanism 86 is best observed in Figs. 4–13, and comprises a platform including two spaced channel members 270, the forwardmost one of which is supported by structural members 271 welded thereto and welded to the upright supporting members 264 (Figs. 2, 4 and 5). Vertical structural members 272 having wide heads support the other channel member 270, one being welded to each of the transverse members 266 (Fig. 5). The two oposed channel members 270 support a plurality of transversely disposed strap members 277, there being five sets of four strap members 277 each mounted on the channel members 270, as is clear from Figs. 1 and 13. Screws or other means are employed to hold the strap members 277 in position. The back of the hopper assembly 252 comprises a pair of end castings 280 which support between them an upper horizontal angle bar 281 and a lower horizontal angle bar 282 (Figs. 5 and 13). The end castings 280 are supported by the rearmost channel member 270 and are further anchored in position by strap members 284 and 285, the former of which extends between and is secured to the upper angle bar 281 and the outermost channel member 270 and the latter of which is secured at its upper end to the left-hand casting 281 and to the rearmost large channel member 265. Five equi-spaced H plates 287 are secured by suitable screws to the angle bars 281 and 282 against which are disposed the edges of stacks of partition strips 87. It is to be noted that the hopper assembly 252 is tilted at an angle so as to bias the partition strips 87 into continued stack position and towards discharge. A vertical partition strip stack guide rod 288 is welded to each H plate 287. The rods 288 may be mounted for lateral adjustment, if desired, by having right angularly bent upper and lower ends which may be received in selected spaced openings in the upper angle member 281 and in the lower angle member 282 and cross piece of the H plates 287. It will be observed by reference to Figs. 66 and 67 that both the top partition strip 87 and the bottom partition strip 88 have notches 291 along the edge remote from the slits 292. The partition strips 88 are stacked with a selected notch 291 engaging the respective guide rod 288 (Fig. 22), whereas the partition strips 87 are stacked with a selected slit 292 about the rod 288' (Fig. 23). It is to be noted that the feet of the H plate 287 are spaced above the strap members 277 (Figs. 5, 11, and 13). This space is just large enough to permit one partition strip of maximum thickness handled by the machine 80 to slide readily beneath the H plates 287. However, the H plates 287 may be mounted for vertical adjustment by means of vertical slots therein through which the mounting screws extend, or the comparable construction described in the applicant's copending application, Serial No. 225,451, filed May 9, 1951, may be used, if desired, such disclosure being incorporated herein by reference.

The hopper discharge assembly 254 is integrated with the hopper assembly 252 and includes a strap member 278 beneath each of the two outer strap members 277 of each group thereof, each strap member 278 being bolted or otherwise secured to the inner faces of the upper flanges of the channel members 270, as is clear from Figs. 11 and 13. Hence, the strap members 278 are spaced from their respective strap members 277 by the thickness of the legs of the channel members 270. A pusher plate 295 is disposed between the strap members 278 and 277 for reciprocation transversely of the floor of the hopper assembly 252 (Figs. 1, 4, 5, 11 and 13). Extending downwardly from the pusher plate 295 are two widely spaced ears 296 to each of which is pivotally connected a link 297. Each link 297 is in turn pivotally connected at its other end to a rocker arm 298 which is secured by a suitable setscrew to a composite shaft 299 rotatably mounted in spaced bearings 300 bolted to the lower surface of spaced angle irons 301 welded or otherwise secured to the inner face of the lower flanges of the channel members 270. The intermediate rocker arm 298 is of U-form to accommodate the link 297 in rotation of the shaft 299, and it joins the two segments of said composite shaft 99 conventionally. A fourth bearing 300 is secured to a structural supporting member at the inner end of the feeding mechanism 86 (Fig. 13). A sprocket 302 is secured to the end of the shaft 299 which extends from beneath the hopper assembly 252 and a chain 303 is trained about the sprocket 302, the other end being trained about a sprocket 304 secured to a shaft 308 extending into a bearing-gear box 309, the sprocket end of the shaft 308 being mounted in a bearing supported on the transverse frame member 266 (Figs. 1–4, and 65). It should be noted here that a shaft 327 connects the shaft 308 and a corresponding shaft 308' of the right-hand feeding mechanism 84 for rotation of the latter by the former. Five pairs of partition strip pusher elements 305 are secured by suitable screws to the pusher plate 295 which are of a cross section clearly shown in Figs. 1, 6, and 8. The pusher elements 305 are spaced so that normally two will simultaneously engage each partition strip 87 to be moved from the hopper assembly 252. An adjustable stop 306 is mounted upon each center pair of strap members 277 for adjustment transversely of the hopper assembly 252 which is adapted to maintain a stack of partition strips rearwardly in position for discharge (Figs. 1 and 9). Suitable spaced screws extend through each stop 306 and engage a small plate 307 at the back side of the adjacent pair of strap members 277 upon which the stop member 306 is mounted.

Upper and lower spaced feed rollers 310 and 311, respectively, are rotatably mounted at the rear of the hopper assembly 252, the upper rollers 310 being keyed or otherwise secured to a shaft 312 which is rotatably mounted in a plurality of spring-biased bearing brackets 313 bolted to the angle bar 282 in spaced relation, as is clear from Figs. 11 and 13. The brackets 313 preferably are like the brackets shown in detail in the above-mentioned copending application, the disclosure of which is incorporated herein by reference. The rollers 311 are keyed or otherwise secured to a shaft 314 rotatably mounted in a plurality of bearing brackets 315 bolted to the rearward channel member 270. Both shafts 312 and 314 extend into a gear casing 316 mounted upon the casting 280 remote from the nesting mechanism 80 (Figs. 6, 7 and 13). A pinion 318 is secured to the end of each shaft 312 and 314 disposed within the gear casing 316 which are in mesh, the pinion upon the shaft 314 being in mesh with a pinion 319 secured by a setscrew to a stub shaft 320 rotatably mounted in the walls of the gear casing 316 and extending therefrom. A pulley 321 is secured by a setscrew or the like to the free end of the stub shaft 320 and has a belt 322 trained thereabout, the other end of which is trained about a pulley 323 secured by a setscrew or the like to the driven shaft 324 of a motor 325 mounted upon the casting 280 (Fig. 4). A conventional switch and power lead are provided for the motor 325. It is to be understood that the motor 325 is energized continuously during partition assembly forming operation of the machine 80 so that the rollers 310 and 311 are continuously driven. It is to be noted from Figs. 11 and 12 that the rollers 310 and 311 receive successively the bottommost partition strips 88 from the pusher elements 305 for further movement transversely of the hopper assembly 252.

The partition strip edgewise disposing unit 256 comprises a plurality of deflector plates 328 which are generally of a cross section clearly indicated in Fig. 5. These deflector plates 328 are secured against a bar 329 and to the rear channel member 270 by suitable bolts (Figs. 5, 8, and 11). Each deflector plate 328 at its free end engages one end of an elongated vertical guide plate 330 which is mounted upon a bolt 331 which extends through a bracket 332 mounted upon the upper flange of one of the channel members 265. As is clear from Figs. 5 and 63, a spacer sleeve 333 is employed for spacing the guide plate 330. Adjacent each guide plate 330 is a second guide plate 335 which is mounted upon the same bolt 331 and which is spaced from the guide plate 330 by a suitable block 336. Five pairs of guide plates 330, 335 are provided which run longitudinally of the feeding mechanism 86 from their respective origin points to a position adjacent the partition strip receiving assembly plate 157, as is clear from Fig. 44. Additional supporting means are provided for the pairs of guide plates 330, 335 in the form of a first post unit 338 and a second post unit 339, each of which includes a vertical outer member, a horizontal member extending from the top thereof, and depending members which are secured to the respective guide plates 330, 335 (Fig. 1). Extending upwardly from each guide plate 335 is a vertical plate 340 against which descending partition strips 81 strike prior to final edgewise deflection, each plate 340 being disposed opposite to a deflector plate 328. Offset bent fingers 341 are welded to the lower edge of both the deflector plates 328 and the vertical plates 340 to provide for ready engagement and removal from the upper edges of the guide plates 330 and 335, as is clearly shown in Fig. 63.

The conveyer assembly 258 of the left-hand strip feeding mechanism 86 is disposed between and mounted upon the channel frame members 265 (Figs. 4, 5, 14, 24, 26–41, and 44). Referring to Fig. 14, a sprocket 350 is mounted upon a stub shaft 351 secured to the rearmost channel member 265 adjacent the end remote from the nesting mechanism 82. Similarly, a second sprocket 352 is mounted upon a stub shaft 353 secured to the other channel member 265. The two sprockets 350 and 352 are disposed in offset relation, as is clear from Fig. 14, and about them are trained chains 354 and 355, respectively. A sleeve and end threaded shaft unit 349 brace the frame members 265 near the sprocket 350. Adjacent the other end of the feeding mechanism 86 are two offset sprockets 356 and 357 which are aligned with the sprockets 350 and 352, respectively, and receive the chains 354 and 355, respectively (Figs. 27, 33, and 44). The sprocket 356 is secured by suitable setscrews to a driven shaft 358 which is rotatably mounted in bearings formed integral with or secured to the channel members 265 (Fig. 27). One end of the shaft 358 has additional bearing support in a bearing formed integral with an inner of two spaced plates 359 which are maintained in spaced relation by four stub shafts 360 welded to the inner plate 359 and securing nuts 361 and which are secured to the flanges of the adjacent channel member 265 by vertically spaced horizontal plate 362 which are welded to the inner plate 359 and are secured by suitable bolts to the flanges of the channel member 265 (Figs. 26, 27). A conventional one-way clutch assembly 364 is secured to one end of the shaft 358 intermediate the plates 359. Extending from the one-way clutch assembly 364 is a stub shaft 365 upon which a pinion 366 is secured by suitable setscrews, the shaft 365 having bearing support in the outer plate 359, as is evident from Fig. 27. It is to be understood that the pinion 366 may be rotated clockwise and counterclockwise, but the shaft 358 will be intermittently rotated in one selected direction only. A ratchet member 367 engages the pinion 366 and rests upon a roller 368 supported upon a suitable stub shaft mounted in the outer plate 359 (Figs. 26, 27). The ratchet member 367 is pivotally connected off-center to a gear 369 at 370, and is adapted to be reciprocated thereby. The gear 369 is rotatably mounted upon a stub shaft having bearing support in the channel member 265. A pinion 371 meshes with the gear 369, the pinion 371 being secured by a setscrew or the like to a driven shaft 372 which has bearing support in the spaced channel members 265, as is diagrammatically indicated in Fig. 65 and as is indicated in Figs. 1, 2, and 4. The shaft 372 is operatively connected to a driven shaft 373 by meshing bevel gears or the like disposed in a bearing-gear box 347 supported on a structural member 348 (Figs. 1, 4, and 65). The other end of the shaft 372 is operatively connected by bevelled gears or the like in the above-mentioned bearing-gear box 309 with the shaft 308. The driven shaft 373 has bearing support near its other end in a bearing bracket 381 adjustably secured to the track 108 of the standard 107 (Figs. 1, 16, 17, 44, and 65), and has a sprocket 382 secured to its free end. A chain 383 is trained around the sprocket 382 and about the above-described sprocket 199. It is to be noted that a shaft 384 connects the shaft 373 with the corresponding shaft 373' of the feeding mechanism 84 (Figs. 1 and 65).

The shaft 358 also extends outwardly beyond the other side of the channel member 265 remote from the one-way clutch 264. A sprocket 375 is secured by a suitable setscrew to this free end of the driven shaft 358 and a chain 376 is trained thereabout (Figs. 27, 33, 44, and 65). Adjacent to and aligned with the sprocket 375 is another sprocket 377 which is secured by a suitable setscrew or the like to a stub shaft 378 mounted on the adjacent channel member 265. The chain 376 is trained about the sprocket 377. The stub shaft 378 also supports the said sprocket 357 offset from the sprocket 356. Hence, both sprockets 356 and 357 are driven from the shaft 358. Extending between the chains 354 and 355 are predeterminately spaced stepped pusher bars 380 (Figs. 14 and 24) each of which has five steps so that five partition strips 87 may be pushed simultaneously towards the assembly zone of the nesting mechanism 82. Rivets or other means are employed to secure the stepped pusher bars 380 to the chains 354 and 355. The stepped pusher bars 380 are spaced apart along the chain a distance equal to the average distance between stations or stacks of partition strips disposed in the hopper assembly 252. Hence, looking downwardly upon the machine 80 as illustrated in Fig. 1, there would be a stepped pusher bar 380 at each deflector plate 328, and the same spacing would obtain throughout the full length of the chains 354 and 355. A horizontal floor plate 382 is disposed between the reaches of the chains 354 and 355 for support of the edgewise partition strips 88.

At the extreme inner end of the left-hand feeding mechanism 86 is a vertically movable, resiliently mounted plate 385 which is supported between the extreme inner ends of the channel members 265, is a continuation, in effect, of the plate 382, and underlies the plate 157 (Figs. 37–41, and 44). The surface of the plate 385 is corrugated longitudinally of the feeding mechanism 86 to assist in maintaining the lower partition strips 88 in the desired vertical position. The plate 385 is vertically movably supported upon a pair of bell crank levers 386 each of which is keyed to a shaft 387 for movement therewith. The upper end of each bell crank lever 386 is pivotally connected to a small diameter shaft 388 midway thereof, each small shaft 388 extending through apertures in a pair of spaced angle brackets 389 welded or otherwise secured to the bottom surface of the plate 385. A link 390 is pivotally connected to the lower ends of the two bell crank levers 386. A tension spring 391 biasing the plate 385 towards its lower normal position is anchored at its upper end in an aperture in the link 390 and is anchored at its lower end to a J member 392 which, in turn, is connected to a structural brace member 393 bolted or otherwise secured to opposed upright members 264 and 264' of the feeding mechanisms 86 and 84, respectively (Figs. 2, 3, and 37). Both shafts 387 have bearing support in bearings formed integral with or secured to the outer surfaces of the webs of the channel members 265. A crank arm 395 is secured by a key to an outward extension of one of the shafts 387 and is pivotally connected at 396 to a composite resilient rod 397, the lower end of which extends through a bracket 398 and threadedly receives a retaining nut 399. A compression spring 400 surrounds the major length of the shaft 397 and abuts against the bracket 398 at the lower end against a portion of the composite rod 397 at the upper end (Figs. 33 and 37). The spring 400 yields to permit the plate 385 to move downwardly in the nesting operation when necessary to eliminate or reduce damage to off-center partition strips. The bracket 398 is welded or otherwise secured to the free end of the lever 218 which, as is described above, is intermittently pivoted by the cam extension 216 of the cam 215 (Figs. 4, 17, 33, and 37). Hence, the plate 385 is moved downwardly to and remains momentarily in its lower position of movement at each revolution of the cam 215 in a timed relation more particularly pointed out below to lower the upper edges of completed partition assemblies from the grooves 180 and the slots 172 of the plate 157 to permit the air blast from the nozzles 246 and 247 to blow them onto a chute 405 or other receiving means at one side of the machine 80.

The pusher unit 260 of the left-hand feeding mechanism 86 is disposed above the inner end of the conveyer assembly 258 in position to pick up the partition strips 88 from the stepped pusher bars 380 as the latter reach the limit of inward travel (Figs. 3, 26, 33, and 44). The pusher unit 260 includes a horizontal shaft 410 each end of which is secured by a bracket 411 to an upright short channel member 412 by suitable bolts. The uprights 412 are welded or otherwise secured to the rear channel member 265. A sleeve bracket 413 is mounted on the shaft 410 for reciprocation and includes a vertically extending portion 414 (Figs. 31, 32). A threaded shaft 415 extends from one side of the vertical portion 414. The upper end of a lever 416 is pivotally retained on the threaded shaft 415 by a nut 417, the lower end of the link 416 being pivotally connected to one end of a link 418. The other end of the link 418 is pivotally connected to a bracket 419 depending from the lower flange of the rear channel member 265, as is clear from Fig. 3. Intermediate its ends, the lever 416 includes a slot 420 which adjustably pivotally receives at 421 one end of a composite shaft 422, the other end of which has secured thereto an eccentric 423 which is secured for actuation to the shaft mounting the gear 369 (Fig. 26). Hence, for each rotation of the shaft mounting the gear 369, the sleeve bracket 413 is reciprocated through one complete cycle. A stepped supporting bracket 425 is adjustably secured by suitable bolts and slots to the vertical portion 414 of the sleeve bracket 413, as is clear from Figs. 33 and 44. The bracket 425 is stepped in the same manner as the stepped pusher bars 380, although the angle of step is greater in the bracket 425, as is evident from a comparison of Figs. 24 and 44. Each of the five longitudinal steps includes a slot 426 from which a depending horizontal pusher finger 427 is adjustably mounted by means of a downwardly extending strap 428 through a suitable nut and bolt assembly 429. Details of the pusher fingers 427 are shown in Figs. 28 through 30, each including a front angularly disposed partition strip pusher face 430. A deflector finger 431 is mounted on each pusher finger 427 a little rearwardly of the pusher face 430 in depending manner. Upon the return stroke of the pusher unit 260, each depending deflector finger 431 engages a cam member 432 secured by suitable screws to the outer surface of each of the guide plates 330 in order to deflect the pusher face 430 of each of the pusher fingers 427 to one side out of the way of the next group of partition strips 88 (Figs. 33 and 35). Also secured to the outer face of each of the vertical guide plates 330 is a leaf spring 433 which extends through a suitable opening in the guide plate 330 for engagement with the passing partition strips 87 to urge them against the opposed guide plates 335 (Figs. 33 and 36).

The right-hand automatic partition strip feeding mechanism 84 is best observed in Figs. 1–3, 20, 21, 23, 25, 28–32, 42–44, and 65. The right-hand feeding mechanism 84 is similar to the left-hand feeding mechanism 86, operating in the same manner as the latter and differing only in details of form and location of elements resulting primarily from the employment of a lesser number of duplicate parts. In the feeding mechanism 84, there is provision of the reception of only three stacks of partition strips 87 and for movement into the assembly zone of only three partition strips at a time. This relationship is readily grasped from an inspection of Figs. 24 and 25, the former illustrating the chain and stepped pusher bar construction in the left-hand feeding mechanism 86 and the latter the equivalent construction in the right-hand feeding mechanism 84. Hence, we have employed the same reference numbers primed for the elements of the feeding mechanism 84, since this is conducive to a quick and ready appreciation of its complete construction.

*Operation*

It is a manifest from the foregoing detailed description taken with the accompanying drawings that the various animated parts and elements of the present partition assembling machine 80 are cooperatively related and timed to automatically successively produce complete partition assemblies from stacks of preformed partition strips. However, a summary of the over-all operation of the machine 80 is conducive to a quick appreciation of its functioning.

As is described above, the rollers 310 and 311 of the hopper discharge assembly 254 and the rollers 310' and 311' of the hopper discharge assembly 254' of the left-hand and right-hand feeding mechanisms 86 and 84, respectively, are continuously driven during the operative use of the machine 80. Separate motors 325 and 325' are provided for this purpose of continuously rotating the respective feed rollers 310, 311, and 310', 311', which may be individually or simultaneously energized apart from the energization of the main motor 227 or which may be energized simultaneously with the energization of the main motor 227 from a single starting button.

The main motor 227 acting through the reduction gearing 228 furnishes the power for driving all of the moving elements with the exception of those just mentioned. The mechanical interconnection of the several movable elements and parts of the feeding mechanisms 84 and 86, except the above-mentioned rollers, is clear from an inspection of Fig. 65. Upon energization of the motor 227, the shaft 373 is rotated immediately, and the chains 354 and 355 of the conveyer assembly 258 of the feeding mechanism 86 are intermittently driven about their supporting sprockets to move the supported stepped pusher bars 380 towards the nesting zone of the nesting mechanism 82. The relationship of the driven gearing is such as to drive the large gear 369 through one complete revolution in the predetermined time interval required, first, to dispose an edgewise group of partition strips 88 beneath the partition strip receiving assembly 100 of the nesting mechanism 82, second, to nest upper partition strips 87 with the lower partition strips 88, and, third, to blow the completed partition assembly from the machine 80. The chains 354 and 355 are moved forwardly a predetermined distance at each revolution of the large gear 369 through the disclosed ratchet and clutch construction so as to deliver a group of edgewise partition strips 88 to the edge of the nesting zone at each forward movement. The pusher unit 260 cooperates with the conveyer assembly 258 to push groups of edgewise disposed partition strips 88 from the end of the travel of the chains 354 and 355 into nesting position beneath the plate 157 of the partition strip receiving assembly 100. The pusher fingers 427 are reciprocated through one cycle for each full revolution of the large gear 369, as is clear from Fig. 65 taken with Fig. 26, since the sleeve bracket 413 is reciprocated by the lever 416, the composite shaft 422, and the eccentric 423 which is secured to the same shaft to which the gear 369 is secured. It is to be noted that the pusher fingers 427 on the return movement are deflected from the path of the next group of forwardly moving edgewise disposed partition strips by the cam members 432 (Figs. 33 and 35). The fingers 427 move the edgewise disposed partition strips 88 into position against the stop members 182 adjustably disposed in the grooves 180 in the bottom of the plate 157, the grooves 180 receiving the upper edges of the partition strips 88. The springs 181 at the entrance of the grooves 180 frictionally engage the upper edges of the entering partition strips 88 and prevent rebound from the stop members 182.

The hopper discharge assembly 254 is actuated to move the bottommost partition strips 88 of each stack into the feed rollers 310 and 311 for edgewise disposition of the partition strips 88 by the edgewise disposing unit 256 ahead of predetermined pusher bars 380 immediately following each forward step of the chains 354 and 355. The sprocket 304 is continuously rotated by the shaft 308 which is rotated by means of its connection to the shaft 373 by means of the shaft 372. As is clear from Figs. 4 and 11–13, the sprocket 304 effects rotation of the composite shaft 299 by means of the chain 303 and the sprocket 302, the composite shaft 299 being connected to the pusher plate 295 by the links 297 for reciprocation of the pusher plate 295 which mounts the pusher elements 305. Figs. 11 and 12 clearly illustrate the movement of the bottommost partition strip 88 from a stack into engagement with the rollers 310 and 311.

The feeding mechanism 84 functions in the same manner as the feeding mechanism 86 to provide edgewise disposed groups of partition strips 87 in position above the plate 157, the partition strips 87 being moved initially into the positions illustrated in Figs. 33, 49 and 50. It will be observed that the guide strips 138 of the plunger assembly 98 receive the upper edges of the partition strips 87 and maintain them in position for subsequent nesting movement. The stop members 162 limit the travel of the partition strips 87 and are adjustable to define the proper positions thereof.

The plunger assembly 98 of the nesting mechanism 82 is reciprocated through one cycle for each revolution of the above-mentioned large gear 369 to push upper partition strips 87 downwardly through the elongated slots 172 of the plate 157 into engagement with the lower partition strips 88 disposed therebeneath. The detail mechanisms for effecting this reciprocal movement are clearly shown in Figs. 4 and 16–18, are described above, and require no further detailing. It is to be noted that the upper partition strips 87 are at an angle of one hundred and five degrees to the lower partition strips 88 during the interengaging operation. This angle at which the feeding mechanisms 84 and 86 are disposed is an optimum one for handling paper board partition strips of various specific materials, but it may be varied for particular installations.

As each partition assembly is completed, it is blown from the machine 80 by the air ejector unit 105 which is tripped to provide an air blast once for each partition assembly forming cycle of the machine 80. A simple chute 405 is illustrated as receiving the completed partition assemblies, but it is to be understood that a conveyer or other mechanism may be employed to automatically remove the completed partition assemblies to a stacking point or other place where further handling is required.

It is manifest that there have been provided a partition assembly forming method and a partition assembling machine which fulfill the objects and advantages sought therefor. The machine 80 will efficiently produce completed partition assemblies at a high rate of speed and will handle preformed partition strips of various sizes and specific paper board material. As disclosed, the preformed partition strips are supplied in hand fed stacks, but it is to be understood that preformed partition strips may be supplied to the hoppers automatically, and that partition strips may be supplied individually, as from rolls, as well as in stacks.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention which is limited only by the claims which follow.

What is claimed is:

1. In a partition assembly forming machine, in combination, feeding mechanism for receiving preformed partition strips and for delivering them in groups of predetermined pattern to an assembly zone comprising means for receiving spaced partition strips, means for moving successive groups of laterally stepped edgewise disposed partition strips into an assembly zone, and means for developing successive groups of laterally stepped edgewise disposed partition strips including conveyer means having spaced stepped movable members and means for simultaneously moving spaced preformed partitions from said receiving means to said conveyor means in vertical positions in successive groups so that a partition strip is delivered to the conveyer means ahead of each stepped movable member which is in position to receive a partition strip as a part of each group.

2. The combination of claim 1 further characterized by the means for moving successive groups of laterally stepped edgewise disposed partition strips into an assembly zone including a pusher assembly located at the assembly zone end of the conveyer means of the reciprocative type having spaced staggered pusher fingers for engaging a group of laterally stepped edgewise disposed partition strips for movement thereof into an assembly zone, and means for deflecting said pusher fingers in rearward movement thereof to allow the next group of partition strips to pass.

3. In a partition assembly forming machine, in combination, a feeding mechanism conveyer assembly including a support, means for supporting edgewise disposed partition strips for longitudinal movement by said conveyer assembly, means for maintaining edgewise disposed partition strips in such positions during longitudinal movement, a chain unit for moving edgewise disposed partition strips including spaced offset related chains and stepped pusher members spaced about the full reach of the chains and supported thereby, and means for actuating said chain unit.

4. The combination of claim 3 and including a partition strip pusher unit cooperatively disposed to receive successive groups of staggered edgewise disposed partition strips from said conveyer assembly, said pusher unit including a plurality of pusher fingers supported from a common stepped bar, each finger being located to engage an edgewise disposed partition strip for movement thereof into a nesting position.

5. The combination of claim 3 and including means for disposing partition strips on said partition strip supporting means including a plurality of deflector plates depending into operative relation with said partition strip edgewise maintaining means, said deflector plates being disposed along the conveyer assembly and stepped laterally thereof at the depending ends in correspondence with said pusher members.

6. In combination, nesting mechanism for partition assembly forming machines comprising means for receiving two vertically spaced edgewise disposed substantially parallel laterally stepped groups of preformed partition strips, means for nesting such groups of preformed partition strips held by said receiving means in such substantially parallel laterally stepped relation, and means for actuating said nesting means to effect nesting action, said partition strip receiving means including a plate assembly having means therebeneath for receiving the top edges of the partition strips of the lower group, and means on top thereof for receiving the lower edges of the partition strips of the upper group.

7. In combination, the nesting mechanism of claim 6 and including means for freeing nested partition assemblies to permit ejection from the nesting mechanism, and means for ejecting freed partition assemblies.

8. In combination, a partition assembly forming machine for automatically completing partition assemblies from supplied partition strips comprising a nesting mechanism having a nesting zone, a first partition strip feeding mechanism operatively associated with said nesting mechanism for feeding successive groups of edgewise disposed spaced partition strips to and into the nesting zone thereof, and a second partition strip feeding mechanism operatively associated with said nesting mechanism and said first feeding mechanism for feeding successive groups of edgewise disposed spaced partition strips to the nesting zone at a different level from the partition strips fed by the first feeding mechanism, said feeding mechanisms being disposed at an obtuse angle to each other, each partition strip feeding mechanism including means for conveying groups of edgewise disposed spaced partition strips to and into the nesting zone in predetermined stepped relation, said nesting mechanism including means for receiving and maintaining the stepped partition strips in such relation for susbequent nesting in said stepped positions, each feeding mechanism also including means for simultaneously feeding successive sets of preformed partition strips to said feeding means in a longitudinally spaced laterally offset pattern and in edgewise disposed relation.

9. The partition assembly forming machine of claim 8 further characterized by each conveying means including a conveyer assembly having means for receiving and moving longitudinally spaced cumulative groups of edgewise disposed preformed partition strips through a predetermined path, and pusher means for picking up successive groups of partition strips from said conveyor assembly and for moving them into the nesting zone of the nesting mechanism.

References Cited in the file of this patent

UNITED STATES PATENTS

| | | |
|---|---|---|
| 529,172 | Herr | Nov. 13, 1894 |
| 586,519 | Herr | July 13, 1897 |
| 609,684 | Lahr | Aug. 23, 1898 |
| 1,523,652 | La Bombard | Jan. 20, 1925 |
| 2,392,005 | Shields | Jan. 1, 1946 |
| 2,493,243 | Godwin | Jan. 3, 1950 |
| 2,612,085 | Merry | Sept. 30, 1952 |